United States Patent

Woods et al.

(10) Patent No.: US 8,717,463 B2
(45) Date of Patent: May 6, 2014

(54) ADAPTIVELY FILTERING COMPRESSIVE IMAGING MEASUREMENTS TO ATTENUATE NOISE

(75) Inventors: Gary L. Woods, Houston, TX (US); James M. Tidman, Round Rock, TX (US)

(73) Assignee: InView Technology Corporation, Austin, TX (US)

(*) Notice: Subject to any disclaimer, the term of this patent is extended or adjusted under 35 U.S.C. 154(b) by 330 days.

(21) Appl. No.: 13/207,258

(22) Filed: Aug. 10, 2011

(65) Prior Publication Data

US 2012/0038798 A1 Feb. 16, 2012

Related U.S. Application Data

(63) Continuation-in-part of application No. 13/193,553, filed on Jul. 28, 2011, now Pat. No. 8,570,405, and a continuation-in-part of application No. 13/193,556, filed on Jul. 28, 2011, now Pat. No. 8,570,406.

(60) Provisional application No. 61/372,826, filed on Aug. 11, 2010.

(51) Int. Cl.
*H04N 5/217* (2011.01)
*G06K 9/00* (2006.01)

(52) U.S. Cl.
USPC .......................................... 348/241; 382/260

(58) Field of Classification Search
USPC .......... 348/241, 242; 382/260, 261, 262, 263, 382/264
See application file for complete search history.

(56) References Cited

U.S. PATENT DOCUMENTS

| 4,805,025 | A | * | 2/1989 | Akiyama et al. ............... 348/250 |
| 5,546,128 | A |   | 8/1996 | Nakagakiuchi et al. |
| 6,654,054 | B1 | * | 11/2003 | Embler ......................... 348/241 |
| 6,763,142 | B2 | * | 7/2004 | Dai et al. ....................... 382/260 |
| 7,356,196 | B2 | * | 4/2008 | Despain ........................ 382/261 |
| 8,199,244 | B2 |   | 6/2012 | Baraniuk et al. |
| 8,319,843 | B2 | * | 11/2012 | Tamura .................... 348/208.99 |
| 2006/0239336 | A1 |   | 10/2006 | Baraniuk et al. |
| 2008/0239095 | A1 | * | 10/2008 | Lee et al. ................... 348/226.1 |
| 2009/0222226 | A1 |   | 9/2009 | Baraniuk et al. |
| 2010/0053352 | A1 | * | 3/2010 | Dekel ......................... 348/222.1 |
| 2012/0038789 | A1 |   | 2/2012 | Kelly et al. |
| 2012/0038790 | A1 |   | 2/2012 | Kelly et al. |

OTHER PUBLICATIONS

International Search Report and Written Opinion in Application No. PCT/US2011/046940 dated Oct. 6, 2011, 11 pages.

(Continued)

*Primary Examiner* — John Villecco
(74) *Attorney, Agent, or Firm* — Meyertons Hood Kivlin Kowert & Goetzel, P.C.; Jeffrey C. Hood; Mark K. Brightwell

(57) ABSTRACT

A compressive imaging (CI) device for attenuating noise. The CI device may acquire samples during steady state portions of pattern modulation periods, avoiding the disturbing effect of transients that occur at pattern transitions. A CI device may acquire and then average multiple samples per spatial pattern to reduce (deterministic and/or random) zero-mean noise. A CI device may apply a filter to the photodetector signal in the analog domain and/or in the digital domain to attenuate noise components, e.g., noise due to electromagnetic interference.

18 Claims, 19 Drawing Sheets

(56) References Cited

OTHER PUBLICATIONS

Amit Ashok and Mark A. Neifeld, "Compressive Light Field Imaging," Proceedings of SPIE, vol. 7690, Apr. 6, 2010, XP040522839, pp. 76900Q-1-76900Q-12.

Muise, et al., "Compressive and Adaptive Imaging for Target Exploitation," Proceedings of SPIE, vol. 7442, Dec. 31, 2009, XP040S01249, pp. 74420A-1-74420A-15.

Babacan, et al., "Compressive sensing of light fields," 2009 16th IEEE International Conference on Image Processing (ICIP), Nov. 7, 2009, XP031629126, pp. 2337-2340.

Robucci, et al., "Compressive Sensing on a CMOS Separable-Transform Image Sensor," Proceedings of the IEEE, vol. 98, No. 6, Jun. 2010, XP011307931, pp. 1089-1101.

Stenner, et al., "Compressive Measurement for Target Tracking in Persistent, Pervasive Surveillance Applications," Proceedings of SPIE, vol. 7468, XP040501968, Dec. 31, 2009, pp. 746808-1-746808-8.

U.S. Appl. No. 60/673,364, entitled "Method and Apparatus for Optical Image Compression", by Richard Baraniuk, et al., filed Apr. 21, 2005.

Takhar, et al., "A New Compressive Imaging Camera Architecture using Optical-Domain Compression," Proceedings of IS&T/SPIE Computational Imaging IV, Jan. 2006, 10 pages.

David L. Donoho, "Compressed Sensing," Department of Statistics, Stanford University, Sep. 14, 2004, 34 pages.

Justin Romberg and Michael Wakin, "Compressed Sensing: A Tutorial," IEEE Statistical Signal Processing Workshop, Madison, Wisconsin, Aug. 26, 2007, available at http://users.ece.gatech.edu/justin/ssp2007, 128 pages.

\* cited by examiner

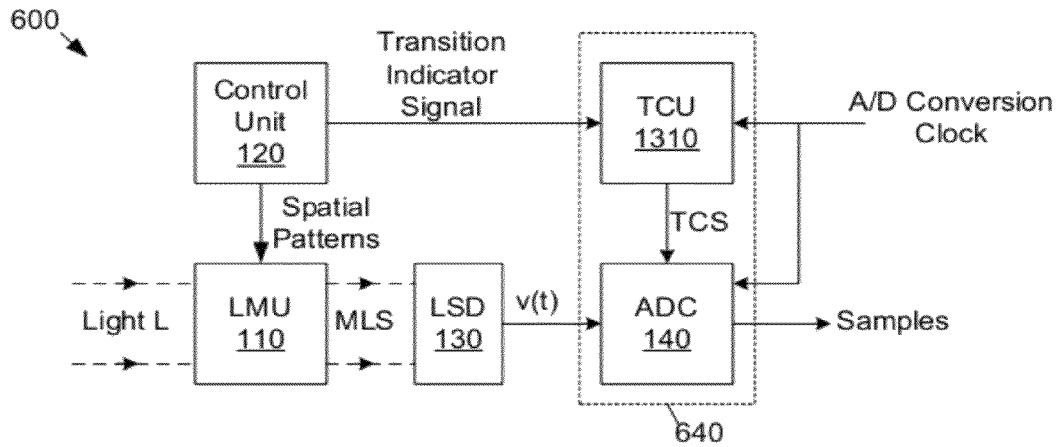

Fig. 13

1400 modulate an incident light stream with a sequence of spatial patterns to obtain a modulated light stream    1410 generate an electrical signal that represents intensity of the modulated light stream as a function of time    1420 obtain samples of the electrical signal that are restricted to steady state intervals of the electrical signal, where each of the steady state intervals is a time interval that (a) starts a predetermined amount of time after a corresponding transition from a corresponding one of said spatial patterns to a next one of said spatial patterns and (b) ends before a corresponding next transition of the sequence of spatial patterns, where the samples correspond to M of the spatial patterns and are usable to construct an n-pixel image or n-voxel video sequence that represents the incident light stream, where M and n are positive integers, where M is smaller than n    1430

Fig. 14A

1600 modulate an incident light stream with a sequence of spatial patterns to obtain a modulated light stream    1610 generate an electrical signal that represents intensity of the modulated light stream as a function of time    1620 sample the electrical signal in order to obtain a first sequence of samples, where the first sequence of samples includes two or more samples corresponding to each of the spatial patterns    1630 generate a sequence of average values, including one average value per spatial pattern, by averaging the two or more samples corresponding to each of the spatial patterns to obtain a corresponding one of the average values, where M of the average values are usable to construct an n-pixel image or n-voxel video sequence representing the incident light stream, wherein M and n are positive integers, wherein M is smaller than n    1640

Fig. 16

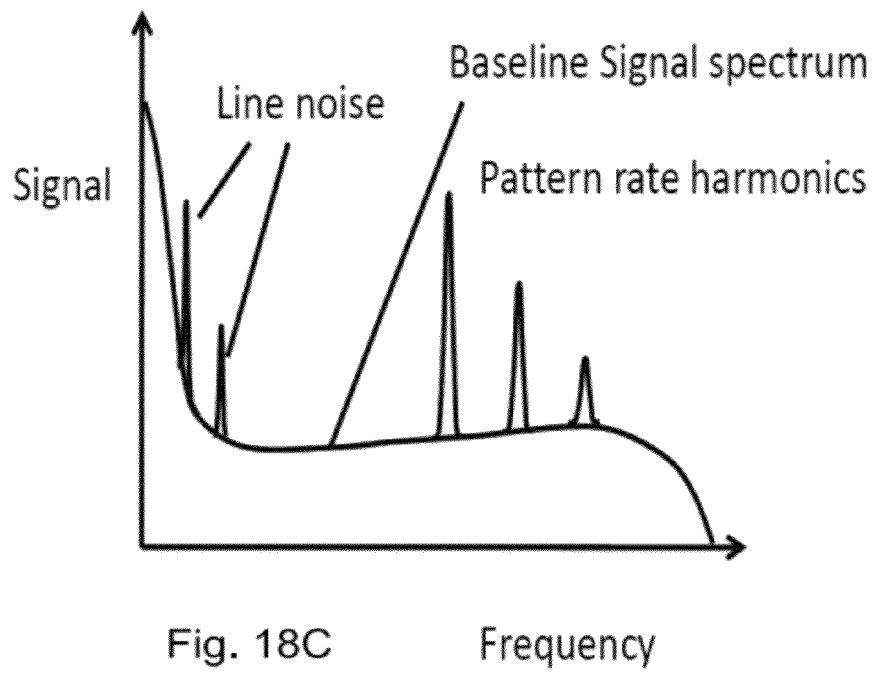

Fig. 18C

1900 modulate an incident light stream with a sequence of spatial patterns to obtain a modulated light stream    1910 generate an electrical signal that represents intensity of the modulated light stream as a function of time    1920 filter the electrical signal in order to obtain a filtered signal, where the action of filtering is performed by an electronic subsystem and attenuates one or more noise components present in the electrical signal, where samples of the filtered signal are usable to construct an image or a video sequence    1930

Fig. 19

ADAPTIVELY FILTERING COMPRESSIVE IMAGING MEASUREMENTS TO ATTENUATE NOISE

RELATED APPLICATION DATA

This application claims the benefit of priority to U.S. Provisional Application No. 61/372,826, filed on Aug. 11, 2010, entitled "Compressive Sensing Systems and Methods", invented by Richard Baraniuk, Gary Woods, Kevin Kelly, Robert Bridge, Sujoy Chatterjee and Lenore McMackin, which is hereby incorporated by reference in its entirety as though fully and completely set forth herein.

This application is a continuation in part of U.S. application Ser. No. 13/193,553, filed on Jul. 28, 2011, now U.S. Pat. No. 8,570,405 invented by Richard Baraniuk, Kevin Kelly, Robert Bridge, Sujoy Chatterjee and Lenore McMackin, titled "Determining Light Level Variation in Compressive Imaging by Injecting Calibration Patterns into Pattern Sequence", which is hereby incorporated by reference in its entirety as though fully and completely set forth herein.

This application is also a continuation in part of U.S. application Ser. No. 13/193,556, filed on Jul. 28, 2011, now U.S. Pat. No. 8,570,406 invented by Richard Baraniuk, Kevin Kelly, Robert Bridge, Sujoy Chatterjee and Lenore McMackin, titled "Low-Pass Filtering of Compressive Imaging Measurements to Infer Light Level Variation", which is hereby incorporated by reference in its entirety as though fully and completely set forth herein.

FIELD OF THE INVENTION

The present invention relates to the field of compressive sensing, and more particularly to systems and methods for removing (or reducing) noise in compressive imaging measurements.

DESCRIPTION OF THE RELATED ART

According to Nyquist theory, a signal $x(t)$ whose signal energy is supported on the frequency interval $[-B,B]$ may be reconstructed from samples $\{x(nT)\}$ of the signal $x(t)$, provided the rate $f_S=1/T_S$ at which the samples are captured is sufficiently high, i.e., provided that $f_S$ is greater than $2B$. Similarly, for a signal whose signal energy is supported on the frequency interval $[A,B]$, the signal may be reconstructed from samples captured with sample rate greater than B−A. A fundamental problem with any attempt to capture a signal $x(t)$ according to Nyquist theory is the large number of samples that are generated, especially when B (or B−A) is large. The large number of samples is taxing on memory resources and on the capacity of transmission channels.

Nyquist theory is not limited to functions of time. Indeed, Nyquist theory applies more generally to any function of one or more real variables. For example, Nyquist theory applies to functions of two spatial variables such as images, to functions of time and two spatial variables such as video, and to the functions used in multispectral imaging, hyperspectral imaging, medical imaging and a wide variety of other applications. In the case of an image $I(x,y)$ that depends on spatial variables x and y, the image may be reconstructed from samples of the image, provided the samples are captured with sufficiently high spatial density. For example, given samples $\{I(n\Delta x, m\Delta y)\}$ captured along a rectangular grid, the horizontal and vertical densities $1/\Delta x$ and $1/\Delta y$ should be respectively greater than $2B_x$ and $2B_y$, where $B_X$ and $B_y$ are the highest x and y spatial frequencies occurring in the image $I(x,y)$. The same problem of overwhelming data volume is experienced when attempting to capture an image according to Nyquist theory. The modern theory of compressive sensing is directed to such problems.

Compressive sensing relies on the observation that many signals (e.g., images or video sequences) of practical interest are not only band-limited but also sparse or approximately sparse when represented using an appropriate choice of transformation, for example, a transformation such as a Fourier transform, a wavelet transform or a discrete cosine transform (DCT). A signal vector v is said to be K-sparse with respect to a given transformation T when the transformation of the signal vector, Tv, has no more than K non-zero coefficients. A signal vector v is said to be sparse with respect to a given transformation T when it is K-sparse with respect to that transformation for some integer K much smaller than the number L of components in the transformation vector Tv.

A signal vector v is said to be approximately K-sparse with respect to a given transformation T when the coefficients of the transformation vector, Tv, are dominated by the K largest coefficients (i.e., largest in the sense of magnitude or absolute value). In other words, if the K largest coefficients account for a high percentage of the energy in the entire set of coefficients, then the signal vector v is approximately K-sparse with respect to transformation T. A signal vector v is said to be approximately sparse with respect to a given transformation T when it is approximately K-sparse with respect to the transformation T for some integer K much less than the number L of components in the transformation vector Tv.

Given a sensing device that captures images with N samples per image and in conformity to the Nyquist condition on spatial rates, it is often the case that there exists some transformation and some integer K very much smaller than N such that the transform of each captured image will be approximately K sparse. The set of K dominant coefficients may vary from one image to the next. Furthermore, the value of K and the selection of the transformation may vary from one context (e.g., imaging application) to the next. Examples of typical transforms that might work in different contexts are the Fourier transform, the wavelet transform, the DCT, the Gabor transform, etc.

Compressive sensing specifies a way of operating on the N samples of an image so as to generate a much smaller set of samples from which the N samples may be reconstructed, given knowledge of the transform under which the image is sparse (or approximately sparse). In particular, compressive sensing invites one to think of the N samples as a vector v in an N-dimensional space and to imagine projecting the vector v onto each vector in a series of M vectors $\{R(i)\}$ in the N-dimensional space, where M is larger than K but still much smaller than N. Each projection gives a corresponding real number $s(i)$, e.g., according to the expression $$s(i) = <v, R(i)>,$$

where the notation $<v,R(i)>$ represents the inner product (or dot product) of the vector v and the vector R(i). Thus, the series of M projections gives a vector U including M real numbers. Compressive sensing theory further prescribes methods for reconstructing (or estimating) the vector v of N samples from the vector U of M real numbers. For example, according to one method, one should determine the vector x that has the smallest length (in the sense of the $L_1$ norm) subject to the condition that $\Phi Tx=U$, where $\Phi$ is a matrix whose rows are the transposes of the vectors R(i), where T is the transformation under which the image is K sparse or approximately K sparse.

Compressive sensing is important because, among other reasons, it allows reconstruction of an image based on M measurements instead of the much larger number of measurements N recommended by Nyquist theory. Thus, for example, a compressive sensing camera would be able to capture a significantly larger number of images for a given size of image store, and/or, transmit a significantly larger number of images per unit time through a communication channel of given capacity.

As mentioned above, compressive sensing operates by projecting the image vector v onto a series of M vectors. As discussed in U.S. patent application Ser. No. 11/379,688 (published as 2006/0239336 and invented by Baraniuk et al.) and illustrated in FIG. 1, an imaging device (e.g., camera) may be configured to take advantage of the compressive sensing paradigm by using a digital micromirror device (DMD) 40. An incident lightfield 10 passes through a lens 20 and then interacts with the DMD 40. The DMD includes a two-dimensional array of micromirrors, each of which is configured to independently and controllably switch between two orientation states. Each micromirror reflects a corresponding portion of the incident light field based on its instantaneous orientation. Any micromirrors in a first of the two orientation states will reflect their corresponding light portions so that they pass through lens 50. Any micromirrors in a second of the two orientation states will reflect their corresponding light portions away from lens 50. Lens 50 serves to concentrate the light portions from the micromirrors in the first orientation state onto a photodiode (or photodetector) situated at location 60. Thus, the photodiode generates a signal whose amplitude at any given time represents a sum of the intensities of the light portions from the micromirrors in the first orientation state.

The compressive sensing is implemented by driving the orientations of the micromirrors through a series of spatial patterns. Each spatial pattern specifies an orientation state for each of the micromirrors. The output signal of the photodiode is digitized by an A/D converter 70. In this fashion, the imaging device is able to capture a series of measurements $\{s(i)\}$ that represent inner products (dot products) between the incident light field and the series of spatial patterns without first acquiring the incident light field as a pixelized digital image. The incident light field corresponds to the vector v of the discussion above, and the spatial patterns correspond to the vectors R(i) of the discussion above.

The incident light field may be modeled by a function I(x,y,t) of two spatial variables and time. Assuming for the discussion of this paragraph that the DMD comprises a rectangular array, the DMD implements a spatial modulation of the incident light field so that the light field leaving the DMD in the direction of the lens 50 might be modeled by $$\{I(n\Delta x, m\Delta y, t) * M(n,m,t)\}$$

where m and n are integer indices, where $I(n\Delta x, m\Delta y, t)$ represents the portion of the light field that is incident upon that $(n,m)^{th}$ mirror of the DMD at time t. The function M(n,m,t) represents the orientation of the $(n,m)^{th}$ mirror of the DMD at time t. At sampling times, the function M(n,m,t) equals one or zero, depending on the state of the digital control signal that controls the $(n,m)^{th}$ mirror. The condition M(n,m,t)=1 corresponds to the orientation state that reflects onto the path that leads to the lens 50. The condition M(n,m,t)=0 corresponds to the orientation state that reflects away from the lens 50.

The lens 50 concentrates the spatially-modulated light field $$\{I(n\Delta x, m\Delta y, t) * M(n,m,t)\}$$

onto a light sensitive surface of the photodiode. Thus, the lens and the photodiode together implement a spatial summation of the light portions in the spatially-modulated light field:

$$S(t) = \sum_{n,m} I(n\Delta x, m\Delta y, t) M(n, m, t).$$

Signal S(t) may be interpreted as the intensity at time t of the concentrated spot of light impinging upon the light sensing surface of the photodiode. The A/D converter captures measurements of S(t). In this fashion, the compressive sensing camera optically computes an inner product of the incident light field with each spatial pattern imposed on the mirrors. The multiplication portion of the inner product is implemented by the mirrors of the DMD. The summation portion of the inner product is implemented by the concentrating action of the lens and also the integrating action of the photodiode.

In a conventional camera, noise is introduced into the image from a number of sources, including the optics, the detectors of the focal plane array, and the A/D converter that digitizes the output of the focal plane array detectors. The techniques for managing and filtering the noise sources in a conventional camera are well understood.

As described above, the method of creating an image is fundamentally different in a compressive imaging device. A single element photodetector is used in conjunction with a spatial light modulator. Sophisticated mathematical techniques are used to reconstruct an image from multiple detector measurements and the corresponding modulation patterns. Noise introduced in the compressive sensing measurements influences the overall image quality. Noise might be introduced by components of the compressive imaging device, e.g., by components such as the spatial light modulator, the optics, the photodetector, the amplifier and the A/D converter. Therefore, there exists a need for systems and method capable of attenuating or minimizing measurement noise.

SUMMARY

In one set of embodiments, a system for operating on light may include a light modulation unit, a light sensing device and an electronic subsystem.

The light modulation unit may be configured to produce a modulated light stream by modulating an incident stream of light with a sequence of spatial patterns.

The light sensing device may be configured to receive the modulated light stream and to generate an electrical signal that represents intensity of the modulated light stream as a function of time.

The electronic subsystem configured to obtain samples of the electrical signal that are restricted to steady state intervals of the electrical signal, wherein each of the steady state intervals is a time interval that (a) starts a predetermined amount of time after a corresponding transition from a corresponding one of said spatial patterns to a next one of said spatial patterns and (b) ends before a corresponding next transition of the sequence of spatial patterns. The predetermined amount of time may be configured to be greater than or equal to a time required for a transient, generated in response to each transition, to decay to a predetermined sufficiently small value. Because the samples are restricted to steady state intervals, they more accurately represent an underlying information sequence, i.e., the sequence of inner products between the image (carried by the incident light stream) and the respective spatial patterns.

In some embodiments, the samples correspond to a set of M of the spatial patterns and are useable to construct an n-pixel image or n-voxel video sequence representing the incident light stream, where M and n are positive integers, and where M is smaller than n. Thus, the system may operate as a compressive-imaging device.

The light sensing device may include (or couple to) an amplifier, in which case, the electrical signal may be interpreted as the output of the amplifier. The above-mentioned "predetermined amount of time" may be determined based on a time constant of the amplifier. Alternatively, the time constant of the amplifier may be determined (e.g., at system design time) based on a selected value for the predetermined amount of time.

In another set of embodiments, the electronic subsystem may be configured to sample the electrical signal in order to obtain an initial sequence of samples, where the initial sequence of samples includes two or more samples corresponding to each of the spatial patterns. The electronic subsystem may be further configured to generate a sequence of average values, including one average value per spatial pattern, by averaging the two or more samples corresponding to each of the spatial patterns in order to obtain a corresponding one of the average values. M of the average values are usable to construct an n-pixel image or n-voxel video sequence representing the incident light stream, where M and n are positive integers, where M is smaller than n.

In yet another set of embodiments, the electronic subsystem may be configured to apply a filter to the electrical signal in order to obtain a filtered signal. The filter is configured to attenuate one or more noise components present in the electrical signal. A set of samples of the filtered signal, corresponding to M of the spatial patterns, is usable to construct an n-pixel image or n-voxel video sequence, where M and n are positive integers, where M is less than n.

Various additional embodiments are described in U.S. Provisional Application No. 61/372,826, which is hereby incorporated by reference in its entirety as though fully and completely set forth herein.

BRIEF DESCRIPTION OF THE DRAWINGS

A better understanding of the present invention can be obtained when the following detailed description of the preferred embodiments is considered in conjunction with the following drawings.

FIG. 13 illustrates an embodiment of system 600, where timing control unit 1310 is configured to enable sample acquisition during steady-state intervals.

FIG. 14A illustrates one embodiment of method 1400 for acquiring samples that are restricted to steady-state intervals.

FIG. 16 illustrates an embodiment of a method 1600 for reducing noise by averaging two or more samples per spatial pattern.

FIG. 18C illustrate an example of a spectrum of a compressive imaging signal, including a baseline spectrum, low-frequency low spikes and spikes to pattern rate harmonics.

FIG. 19 illustrates an embodiment of a method 1900 for removing noise from the compressive sensing signal by filtering.

Figure 1:
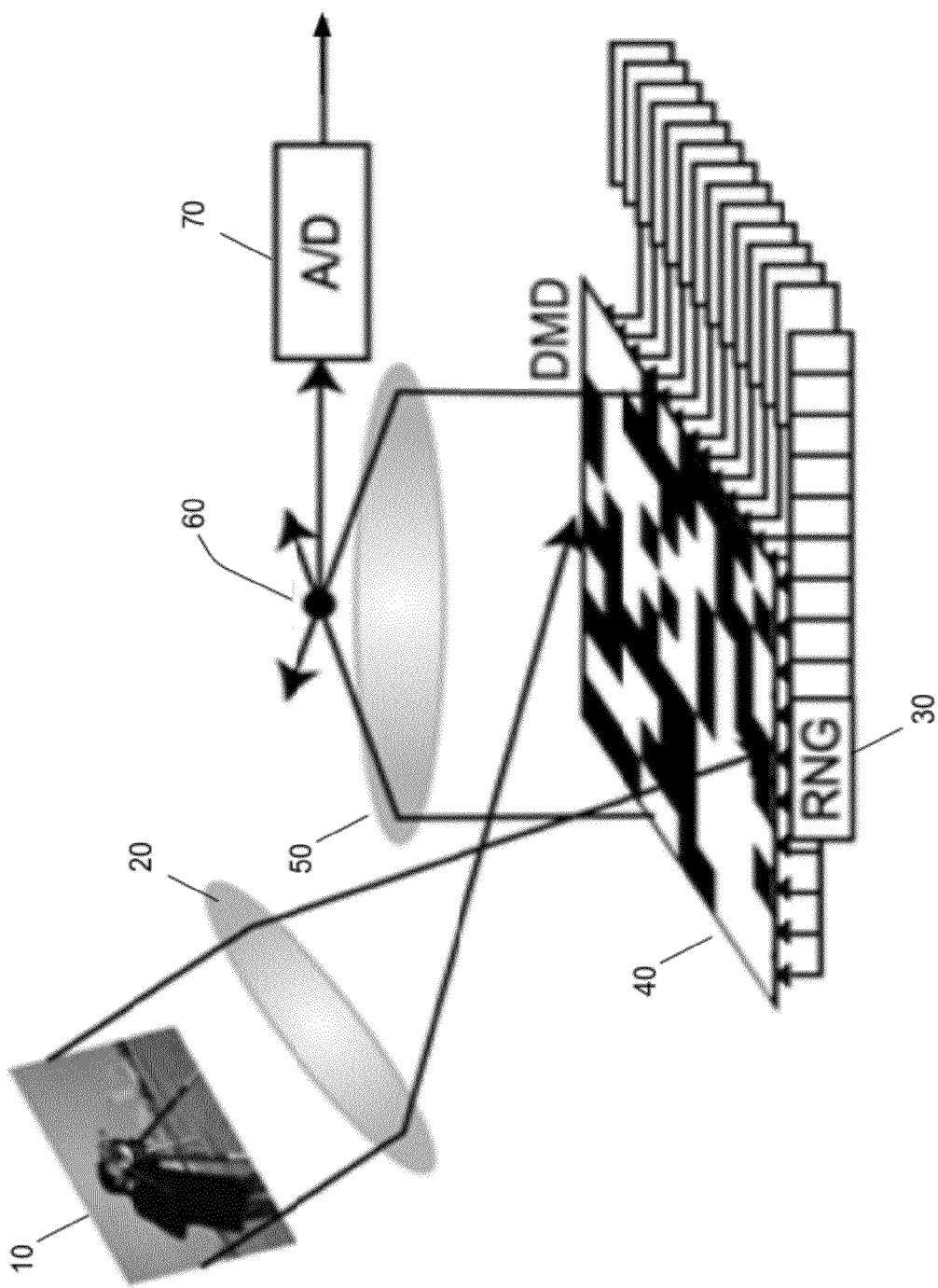
FIG. 1 illustrates a compressive sensing camera according to the prior art.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The following patent applications provide teachings regarding compressive sensing and compressive imaging:

U.S. Provisional Application No. 60/673,364 entitled "Method and Apparatus for Optical Image Compression," filed on Apr. 21, 2005;

U.S. Provisional Application No. 60/679,237 entitled "Method and Apparatus for Reconstructing Data from Multiple Sources," filed on May 10, 2005;

U.S. Provisional Application No. 60/729,983 entitled "Random Filters for Compressive Sampling and Reconstruction," filed on Oct. 25, 2005;

U.S. Provisional Application No. 60/732,374 entitled "Method and Apparatus for Compressive Sensing for Analog-to-Information Conversion," filed on Nov. 1, 2005;

U.S. Provisional Application No. 60/735,616 entitled "Method and Apparatus for Distributed Compressed Sensing," filed on Nov. 10, 2005;

U.S. Provisional Application No. 60/759,394 entitled "Sudocodes: Efficient Compressive Sampling Algorithms for Sparse Signals," filed on Jan. 16, 2006;

U.S. patent application Ser. No. 11/379,688 entitled "Method and Apparatus for Compressive Imaging Device", filed on Apr. 21, 2006; and U.S. patent application Ser. No. 12/791,171 entitled "Method and Apparatus for Compressive Imaging Device", filed on Jun. 1, 2010.

TERMINOLOGY

A memory medium is a non-transitory medium configured for the storage and retrieval of information. Examples of memory media include: various kinds of semiconductor-based memory such as RAM and ROM; various kinds of magnetic media such as magnetic disk, tape, strip and film; various kinds of optical media such as CD-ROM and DVD-ROM; various media based on the storage of electrical charge and/or any of a wide variety of other physical quantities; media fabricated using various lithographic techniques; etc. The term "memory medium" includes within its scope of meaning the possibility that a given memory medium might be a union of two or more memory media that reside at different locations, e.g., on different chips in a system or on different computers in a network. A memory medium is typically computer-readable, e.g., is capable of being read by a computer.

A computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

A computer system is any device (or combination of devices) having at least one processor that is configured to execute program instructions stored on a memory medium. Examples of computer systems include personal computers (PCs), workstations, laptop computers, tablet computers, mainframe computers, server computers, client computers, network or Internet appliances, hand-held devices, mobile devices, personal digital assistants (PDAs), computer-based television systems, grid computing systems, wearable computers, computers implanted in living organisms, computers embedded in head-mounted displays, computers embedded in sensors forming a distributed network, etc.

A programmable hardware element (PHE) is a hardware device that includes multiple programmable function blocks connected via a system of programmable interconnects. Examples of PHEs include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores).

As used herein, the term "light" is meant to encompass within its scope of meaning any electromagnetic radiation whose spectrum lies within the wavelength range $[\lambda_L, \lambda_U]$, where the wavelength range includes the visible spectrum, the ultra-violet (UV) spectrum, infrared (IR) spectrum and the terahertz (THz) spectrum. Thus, for example, visible radiation, or UV radiation, or IR radiation, or THz radiation, or any combination thereof is "light" as used herein.

In some embodiments, a computer system may be configured to include a processor (or a set of processors) and a memory medium, where the memory medium stores program instructions, where the processor is configured to read and execute the program instructions stored in the memory medium, where the program instructions are executable by the processor to implement a method, e.g., any of the various method embodiments described herein, or, any combination of the method embodiments described herein, or, any subset of any of the method embodiments described herein, or, any combination of such subsets.

System 100 for Operating on Light

Figure 2A:
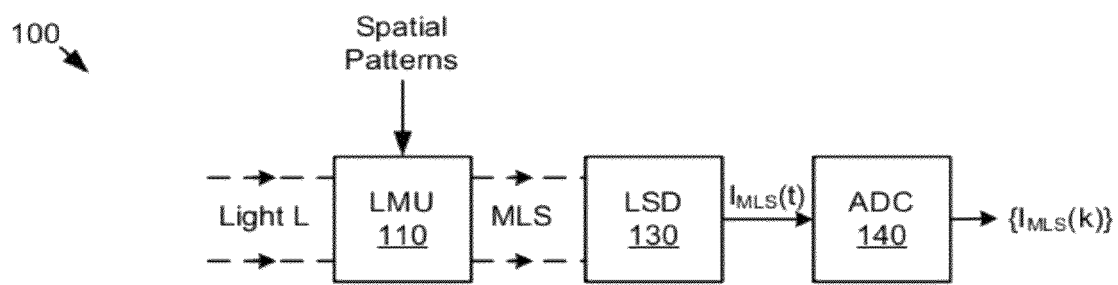
FIG. 2A illustrates one embodiment of a system 100 that is operable to capture compressive imaging samples and also samples of background light level. (LMU is an acronym for "light modulation unit". MLS is an acronym for "modulated light stream". LSD is an acronym for "light sensing device".)

A system 100 for operating on light may be configured as shown in FIG. 2A. The system 100 may include a light modulation unit 110, a light sensing device 130 and an analog-to-digital converter (ADC) 140.

The light modulation unit 110 is configured to modulate a received stream of light L with a series of spatial patterns in order to produce a modulated light stream (MLS). The spatial patterns of the series may be applied sequentially to the light stream so that successive time slices of the light stream are modulated, respectively, with successive ones of the spatial patterns. (The action of sequentially modulating the light stream L with the spatial patterns imposes the structure of time slices on the light stream.) The light modulation unit 110 includes a plurality of light modulating elements configured to modulate corresponding portions of the light stream. Each of the spatial patterns specifies an amount (or extent or value) of modulation for each of the light modulating elements. Mathematically, one might think of the light modulation unit's action of applying a given spatial pattern as performing an element-wise multiplication of a light field vector $(x_{ij})$ representing a time slice of the light stream L by a vector of scalar modulation values $(m_{ij})$ to obtain a time slice of the modulated light stream: $(m_{ij})*(x_{ij})=(m_{ij}*x_{ij})$. The vector $(m_{ij})$ is specified by the spatial pattern. Each light modulating element effectively scales (multiplies) the intensity of its corresponding stream portion by the corresponding scalar factor.

The light modulation unit 110 may be realized in various ways. In some embodiments, the LMU 110 may be realized by a plurality of mirrors (e.g., micromirrors) whose orientations are independently controllable. In another set of embodiments, the LMU 110 may be realized by an array of elements whose transmittances are independently controllable, e.g., as with an array of LCD shutters. An electrical control signal supplied to each element controls the extent to which light is able to transmit through the element. In yet another set of embodiments, the LMU 110 may be realized by an array of independently-controllable mechanical shutters (e.g., micromechanical shutters) that cover an array of apertures, with the shutters opening and closing in response to electrical control signals, thereby controlling the flow of light through the corresponding apertures. In yet another set of embodiments, the LMU 110 may be realized by a perforated mechanical plate, with the entire plate moving in response to electrical control signals, thereby controlling the flow of light through the corresponding perforations. In yet another set of embodiments, the LMU 110 may be realized by an array of transceiver elements, where each element receives and then retransmits light in a controllable fashion. In yet another set of embodiments, the LMU 110 may be realized by a grating light valve (GLV) device. In yet another embodiment, the LMU 110 may be realized by a liquid-crystal-on-silicon (LCOS) device.

In some embodiments, the light modulating elements are arranged in an array, e.g., a two-dimensional array or a one-dimensional array. Any of various array geometries are contemplated. For example, in some embodiments, the array is a square array or rectangular array. In another embodiment, the array is hexagonal. In some embodiments, the light modulating elements are arranged in a spatially random fashion.

The light sensing device 130 is configured to receive the modulated light stream MLS and to generate an analog electrical signal $I_{MLS}(t)$ representing intensity of the modulated light stream as a function of time.

The light sensing device 130 may include one or more light sensing elements. The term "light sensing element" may be interpreted as meaning "a transducer between a light signal and an electrical signal". For example, a photodiode is a light sensing element. In various other embodiments, light sensing elements might include devices such as metal-semiconductor-metal (MSM) photodetectors, phototransistors, phototubes and photomultiplier tubes.

In some embodiments, the light sensing device 130 includes one or more amplifiers (e.g., transimpedance amplifiers) to amplify the analog electrical signals generated by the one or more light sensing elements.

The ADC 140 acquires a sequence of samples $\{I_{MLS}(k)\}$ of the analog electrical signal $I_{MLS}(t)$. Each of the samples may be interpreted as an inner product between a corresponding time slice of the light stream L and a corresponding one of the spatial patterns. The set of samples $\{I_{MLS}(k)\}$ comprises an encoded representation, e.g., a compressed representation, of an image (or a video sequence) and may be used to construct the image (or video sequence) based on any construction algorithm known in the field of compressive sensing. (For video sequence construction, the samples may be partitioned into contiguous subsets, and then the subsets may be processed to construct corresponding images.)

In some embodiments, the samples $\{I_{MLS}(k)\}$ may be used for some purpose other than, or in addition to, image (or video) construction. For example, system 100 (or some other system) may operate on the compensated samples to perform an inference task, such as detecting the presence of a signal or object, identifying a signal or an object, classifying a signal or an object, estimating one or more parameters relating to a signal or an object, tracking a signal or an object, etc. In some embodiments, an object under observation by system 100 may be identified or classified by virtue of its sample set $\{I_{MLS}(k)\}$, or parameters derived from that sample set, being similar to one of a collection of stored sample sets (or parameter sets).

In some embodiments, the light sensing device 130 includes exactly one light sensing element. (For example, the single light sensing element may be a photodiode.) The light sensing element may couple to an amplifier (e.g., a TIA) (e.g., a multi-stage amplifier).

In some embodiments, the light sensing device 130 may include a plurality of light sensing elements (e.g., photodiodes). Each light sensing element may convert light impinging on its light sensing surface into a corresponding analog electrical signal representing intensity of the impinging light as a function of time. In some embodiments, each light sensing element may couple to a corresponding amplifier so that the analog electrical signal produced by the light sensing element can be amplified prior to digitization. System 100 may be configured so that each light sensing element receives, e.g., a corresponding spatial portion (or spectral portion) of the modulated light stream.

In one embodiment, the analog electrical signals produced, respectively, by the light sensing elements may be summed to obtain a sum signal. The sum signal may then be digitized by the ADC 140 to obtain the sequence of samples $\{I_{MLS}(k)\}$. In another embodiment, the analog electrical signals may be individually digitized, each with its own ADC, to obtain corresponding sample sequences. The sample sequences may then be added to obtain the sequence $\{I_{MLS}(k)\}$. In another embodiment, the analog electrical signals produced by the light sensing elements may be sampled by a smaller number of ADCs than light sensing elements through the use of time multiplexing. For example, in one embodiment, system 100 may be configured to sample two or more of the analog electrical signals by switching the input of an ADC among the outputs of the two or more corresponding light sensing elements at a sufficiently high rate.

In some embodiments, the light sensing device 130 may include an array of light sensing elements. Arrays of any of a wide variety of sizes, configurations and material technologies are contemplated. In one embodiment, the light sensing device 130 includes a focal plane array coupled to a readout integrated circuit. In one embodiment, the light sensing device 130 may include an array of cells, where each cell includes a corresponding light sensing element and is configured to integrate and hold photo-induced charge created by the light sensing element, and to convert the integrated charge into a corresponding cell voltage. The light sensing device may also include (or couple to) circuitry configured to sample the cell voltages using one or more ADCs.

In some embodiments, the light sensing device 130 may include a plurality (or array) of light sensing elements, where each light sensing element is configured to receive a corresponding spatial portion of the modulated light stream, and each spatial portion of the modulated light stream comes from a corresponding sub-region of the array of light modulating elements. (For example, the light sensing device 130 may include a quadrant photodiode, where each quadrant of the photodiode is configured to receive modulated light from a corresponding quadrant of the array of light modulating elements. As another example, the light sensing element 130 may include a bi-cell photodiode.) Each light sensing element generates a corresponding signal representing intensity of the corresponding spatial portion as a function of time. Each signal may be digitized (e.g., by a corresponding ADC) to obtain a corresponding sequence of samples. Each sequence of samples may be processed to recover a corresponding sub-image. The sub-images may be joined together to form a whole image.

In some embodiments, the light sensing device 130 includes a small number of light sensing elements (e.g., in respective embodiments, one, two, less than 8, less than 16, less the 32, less than 64, less than 128, less than 256). Because the light sensing device of these embodiments includes a small number of light sensing elements (e.g., far less than the typical modern CCD-based or CMOS-based camera), an entity configuring any of these embodiments may afford to spend more per light sensing element to realize features that are beyond the capabilities of modern array-based image sensors of large pixel count, e.g., features such as higher sensitivity, extended range of sensitivity, new range(s) of sensitivity, extended dynamic range, higher bandwidth/lower response time. Furthermore, because the light sensing device includes a small number of light sensing elements, an entity configuring any of these embodiments may use newer light sensing technologies (e.g., based on new materials or combinations of materials) that are not yet mature enough to be manufactured into focal plane arrays (FPA) with large pixel count. For example, new detector materials such as superlattices, quantum dots, carbon nanotubes and graphene can significantly enhance the performance of IR detectors by reducing detector noise, increasing sensitivity, and/or decreasing detector cooling requirements.

In one embodiment, the light sensing device 130 is a thermo-electrically cooled InGaAs detector. (InGaAs stands for "Indium Gallium Arsenide".) In other embodiments, the InGaAs detector may be cooled by other mechanisms (e.g., liquid nitrogen or a Sterling engine). In yet other embodiments, the InGaAs detector may operate without cooling. In yet other embodiments, different detector materials may be used, e.g., materials such as MCT (mercury-cadmium-telluride), InSb (Indium Antimonide) and VOx (Vanadium Oxide).

In different embodiments, the light sensing device 130 may be sensitive to light at different wavelengths or wavelength ranges. In some embodiments, the light sensing device 130 may be sensitive to light over a broad range of wavelengths, e.g., over the entire visible spectrum or over the entire range $[X_L, X_U]$ as defined above.

In some embodiments, the light sensing device 130 may include one or more dual-sandwich photodetectors. A dual sandwich photodetector includes two photodiodes stacked (or layered) one on top of the other.

In one embodiment, the light sensing device 130 may include one or more avalanche photodiodes.

In some embodiments, a filter may be placed in front of the light sensing device 130 to restrict the modulated light stream to a specific range of wavelengths or polarization. Thus, the signal $I_{MLS}(t)$ generated by the light sensing device 130 may be representative of the intensity of the restricted light stream. For example, by using a filter that passes only IR light, the light sensing device may be effectively converted into an IR detector. The sample principle may be applied to effectively convert the light sensing device into a detector for red or blue or green or UV or any desired wavelength band, or, a detector for light of a certain polarization.

In some embodiments, system 100 includes a color wheel whose rotation is synchronized with the application of the spatial patterns to the light modulation unit. As it rotates, the color wheel cyclically applies a number of optical bandpass filters to the modulated light stream MLS. Each bandpass filter restricts the modulated light stream to a corresponding sub-band of wavelengths. Thus, the samples captured by the ADC 140 will include samples of intensity in each of the sub-bands. The samples may be de-multiplexed to form separate sub-band sequences. Each sub-band sequence may be processed to generate a corresponding sub-band image. (As an example, the color wheel may include a red-pass filter, a green-pass filter and a blue-pass filter to support color imaging.)

In some embodiments, the system 100 may include a memory (or a set of memories of one or more kinds).

Figure 2B:
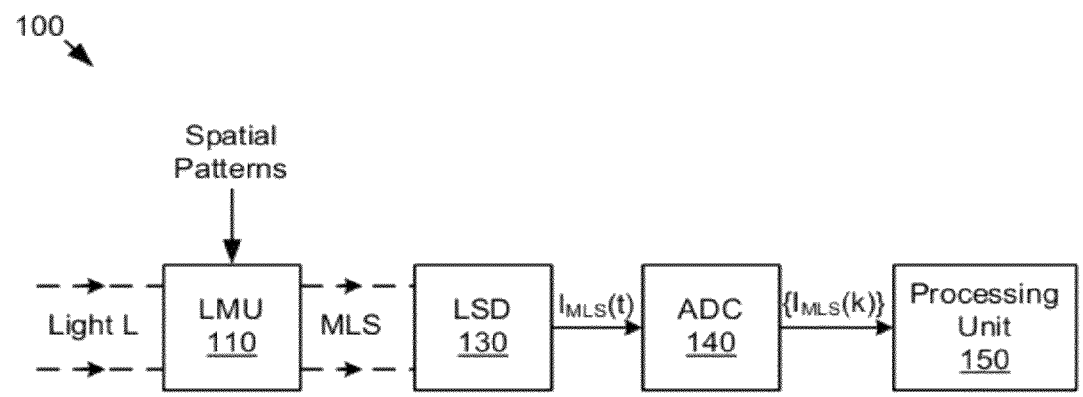
FIG. 2B illustrates an embodiment of system 100 that includes a processing unit 150.

In some embodiments, system 100 may include a processing unit 150, e.g., as shown in FIG. 2B. The processing unit 150 may be a digital circuit or a combination of digital circuits. For example, the processing unit may be a microprocessor (or system of interconnected of microprocessors), a programmable hardware element such as a field-programmable gate array (FPGA), an application specific integrated circuit (ASIC), or any combination such elements. The processing unit 150 may be configured to perform one or more functions such as image/video construction, system control, user interface, statistical analysis, and one or more inferences tasks.

The system 100 (e.g., the processing unit 150) may store the samples $\{I_{MLS}(k)\}$ in a memory, e.g., a memory resident in the system 100 or in some other system.

In one embodiment, processing unit 150 is configured to operate on the samples $\{I_{MLS}(k)\}$ to generate the image or video sequence. In this embodiment, the processing unit 150 may include a microprocessor configured to execute software (i.e., program instructions), especially software for performing an image/video construction algorithm. In one embodiment, system 100 is configured to transmit the compensated samples to some other system through a communication channel. (In embodiments where the spatial patterns are randomly-generated, system 100 may also transmit the random seed(s) used to generate the spatial patterns.) That other system may operate on the samples to construct the image/video. System 100 may have one or more interfaces configured for sending (and perhaps also receiving) data through one or more communication channels, e.g., channels such as wireless channels, wired channels, fiber optic channels, acoustic channels, laser-based channels, etc.

In some embodiments, processing unit 150 is configured to use any of a variety of algorithms and/or any of a variety of transformations to perform image/video construction. System 100 may allow a user to choose a desired algorithm and/or a desired transformation for performing the image/video construction.

In one embodiment, system 100 may include a light transmitter configured to generate a light beam (e.g., a laser beam), to modulate the light beam with a data signal and to transmit the modulated light beam into space or onto an optical fiber. System 100 may also include a light receiver configured to receive a modulated light beam from space or from an optical fiber, and to recover a data stream from the received modulated light beam.

In one embodiment, system 100 may be configured as a low-cost sensor system having minimal processing resources, e.g., processing resources insufficient to perform image (or video) construction in user-acceptable time. In this embodiment, the system 100 may store and/or transmit the samples $\{I_{MLS}(k)\}$ so that another agent, more plentifully endowed with processing resources, may perform the image/video construction based on the samples.

Figure 2C:
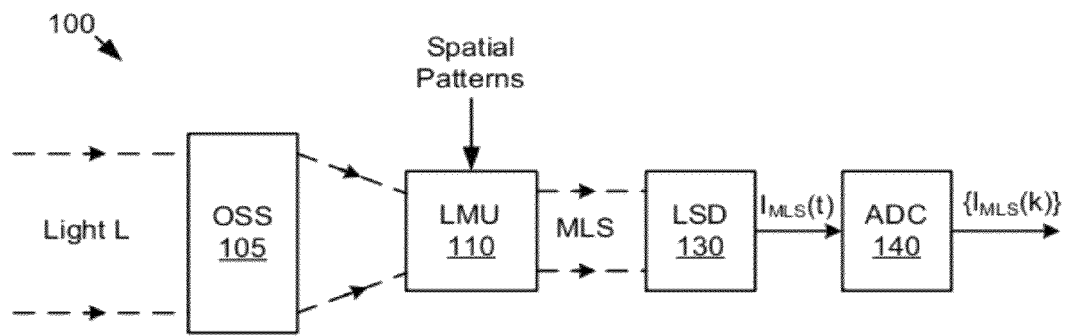
FIG. 2C illustrates an embodiment of system 100 that includes an optical subsystem 105 to focus received light L onto the light modulation unit 110.
Figure 2D:
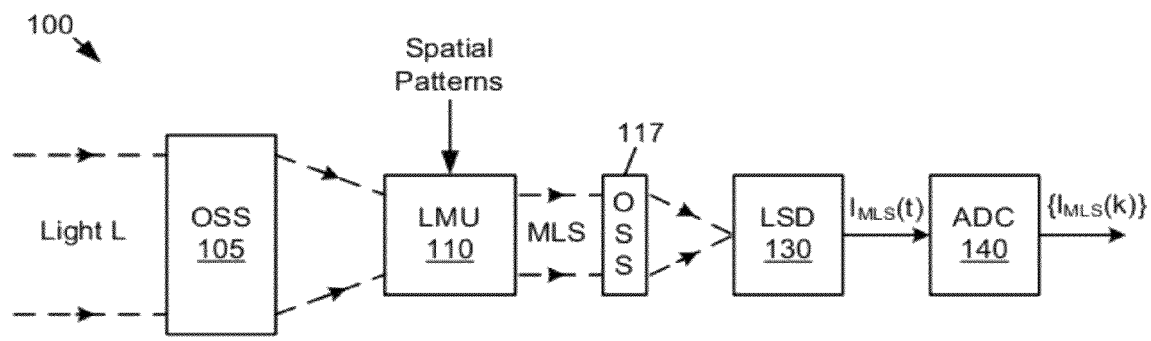
FIG. 2D illustrates an embodiment of system 100 that includes an optical subsystem 117 to direct or focus or concentrate the modulated light stream MLS onto the light sensing device 130.

In some embodiments, system 100 may include an optical subsystem 105 that is configured to modify or condition the light stream L before it arrives at the light modulation unit 110, e.g., as shown in FIG. 2C. For example, the optical subsystem 105 may be configured to receive the light stream L from the environment and to focus the light stream onto a modulating plane of the light modulation unit 110. The optical subsystem 105 may include a camera lens (or a set of lenses). The lens (or set of lenses) may be adjustable to accommodate a range of distances to external objects being imaged/sensed/captured.

In some embodiments, system 100 may include an optical subsystem 117 to direct the modulated light stream MLS onto a light sensing surface (or surfaces) of the light sensing device 130.

In some embodiments, the optical subsystem 117 may include one or more lenses, and/or, one or more mirrors.

In some embodiments, the optical subsystem 117 is configured to focus the modulated light stream onto the light sensing surface (or surfaces). The term "focus" implies an attempt to achieve the condition that rays (photons) diverging from a point on an object plane converge to a point (or an acceptably small spot) on an image plane. The term "focus" also typically implies continuity between the object plane point and the image plane point (or image plane spot)—points close together on the object plane map respectively to points (or spots) close together on the image plane. In at least some of the system embodiments that include an array of light sensing elements, it may be desirable for the modulated light stream MLS to be focused onto the light sensing array so that there is continuity between points on the light modulation unit LMU and points (or spots) on the light sensing array.

In some embodiments, the optical subsystem 117 may be configured to direct the modulated light stream MLS onto the light sensing surface (or surfaces) of the light sensing device 130 in a non-focusing fashion. For example, in a system embodiment that includes only one photodiode, it may not be so important to achieve the "in focus" condition at the light sensing surface of the photodiode since positional information of photons arriving at that light sensing surface will be immediately lost.

In one embodiment, the optical subsystem 117 may be configured to receive the modulated light stream and to concentrate the modulated light stream into an area (e.g., a small area) on a light sensing surface of the light sensing device 130. Thus, the diameter of the modulated light stream may be reduced (possibly, radically reduced) in its transit from the optical subsystem 117 to the light sensing surface (or surfaces) of the light sensing device 130. For example, in some embodiments, the diameter may be reduced by a factor of more than 1.5 to 1. In other embodiments, the diameter may be reduced by a factor of more than 2 to 1. In yet other embodiments, the diameter may be reduced by a factor of more than 10 to 1. In yet other embodiments, the diameter may be reduced by factor of more than 100 to 1. In yet other embodiments, the diameter may be reduced by factor of more than 400 to 1. In one embodiment, the diameter is reduced so that the modulated light stream is concentrated onto the light sensing surface of a single light sensing element (e.g., a single photodiode).

In some embodiments, this feature of concentrating the modulated light stream onto the light sensing surface (or surfaces) of the light sensing device allows the light sensing device to sense, at any given time, the sum (or surface integral) of the intensities of the modulated light portions within the modulated light stream. (Each time slice of the modulated light stream comprises a spatial ensemble of modulated light portions due to the modulation unit's action of applying the corresponding spatial pattern to the light stream.)

In some embodiments, the modulated light stream MLS may be directed onto the light sensing surface of the light sensing device 130 without concentration, i.e., without decrease in diameter of the modulated light stream, e.g., by use of photodiode having a large light sensing surface, large enough to contain the cross section of the modulated light stream without the modulated light stream being concentrated.

Figure 2E:
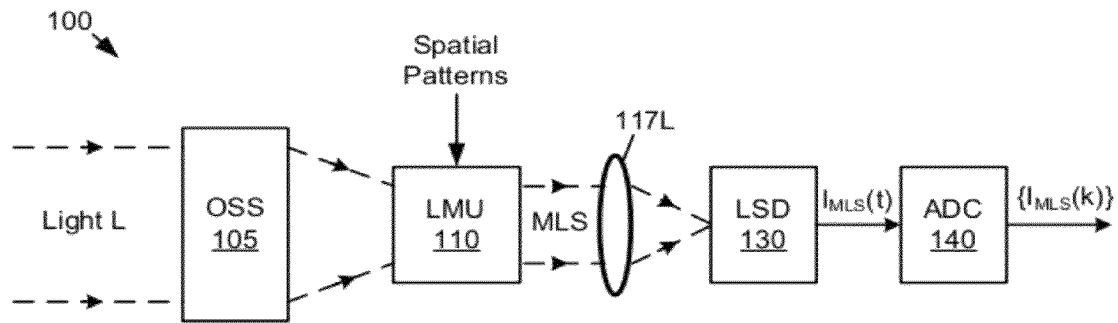
FIG. 2E illustrates an embodiment where the optical subsystem 117 is realized by a lens 117L.

In some embodiments, the optical subsystem 117 may include one or more lenses. FIG. 2E shows an embodiment where optical subsystem 117 is realized by a lens 117L, e.g., a biconvex lens or a condenser lens.

In some embodiments, the optical subsystem 117 may include one or more mirrors. In one embodiment, the optical subsystem 117 includes a parabolic mirror (or spherical mirror) to concentrate the modulated light stream onto a neighborhood (e.g., a small neighborhood) of the parabolic focal point. In this embodiment, the light sensing surface of the light sensing device may be positioned at the focal point.

In some embodiments, system 100 may include an optical mechanism (e.g., an optical mechanism including one or more prisms and/or one or more diffraction gratings) for splitting or separating the modulated light stream MLS into two or more separate streams (perhaps numerous streams), where each of the streams is confined to a different wavelength range. The separate streams may each be sensed by a separate light sensing device. (In some embodiments, the number of wavelength ranges may be, e.g., greater than 8, or greater than 16, or greater than 64, or greater than 256, or greater than 1024.) Furthermore, each separate stream may be directed (e.g., focused or concentrated) onto the corresponding light sensing device as described above in connection with optical subsystem 117. The samples captured from each light sensing device may be used to construct a corresponding image for the corresponding wavelength range. In one embodiment, the modulated light stream is separated into red, green and blue streams to support color (R,G,B) measurements. In another embodiment, the modulated light stream may be separated into IR, red, green, blue and UV streams to support five-channel 7 imaging: (IR, R, G, B, UV). In some embodiments, the modulated light stream may be separated into a number of sub-bands (e.g., adjacent sub-bands) within the IR band to support multi-spectral or hyper-spectral IR imaging. In some embodiments, the number of IR sub-bands may be, e.g., greater than 8, or greater than 16, or greater than 64, or greater than 256, or greater than 1024. In some embodiments, the modulated light stream may experience two or more stages of spectral separation. For example, in a first stage the modulated light stream may be separated into an IR stream confined to the IR band and one or more additional streams confined to other bands. In a second stage, the IR stream may be separated into a number of sub-bands (e.g., numerous sub-bands) (e.g., adjacent sub-bands) within the IR band to support multispectral or hyper-spectral IR imaging.

In some embodiments, system 100 may include an optical mechanism (e.g., a mechanism including one or more beam splitters) for splitting or separating the modulated light stream MLS into two or more separate streams, e.g., where each of the streams have the same (or approximately the same) spectral characteristics or wavelength range. The separate streams may then pass through respective bandpass filters to obtain corresponding modified streams, wherein each modified stream is restricted to a corresponding band of wavelengths. Each of the modified streams may be sensed by a separate light sensing device. (In some embodiments, the number of wavelength bands may be, e.g., greater than 8, or greater than 16, or greater than 64, or greater than 256, or greater than 1024.) Furthermore, each of the modified streams may be directed (e.g., focused or concentrated) onto the corresponding light sensing device as described above in connection with optical subsystem 117. The samples captured from each light sensing device may be used to construct a corresponding image for the corresponding wavelength band. In one embodiment, the modulated light stream is separated into three streams which are then filtered, respectively, with a red-pass filter, a green-pass filter and a blue-pass filter. The resulting red, green and blue streams are then respectively detected by three light sensing devices to support color (R,G,B) acquisition. In another similar embodiment, five streams are generated, filtered with five respective filters, and then measured with five respective light sensing devices to support (IR, R, G, B, UV) multi-spectral acquisition. In yet another embodiment, the modulated light stream of a given band may be separated into a number of (e.g., numerous) sub-bands to support multi-spectral or hyper-spectral imaging.

In some embodiments, system 100 may include an optical mechanism for splitting or separating the modulated light stream MLS into two or more separate streams. The separate streams may be directed to (e.g., concentrated onto) respective light sensing devices. The light sensing devices may be configured to be sensitive in different wavelength ranges, e.g., by virtue of their different material properties. Samples captured from each light sensing device may be used to construct a corresponding image for the corresponding wavelength range.

Figure 2F:
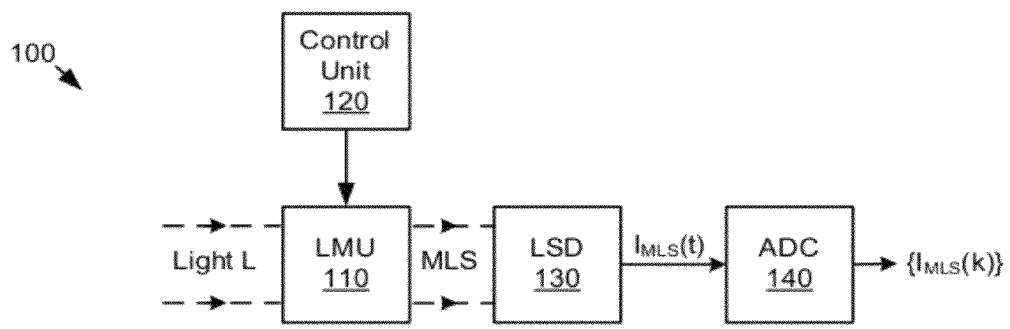
FIG. 2F illustrates an embodiment of system 100 that includes a control unit that is configured to supply a series of spatial patterns to the light modulation unit 110.

In some embodiments, system 100 may include a control unit 120 configured to supply the spatial patterns to the light modulation unit 110, as shown in FIG. 2F. The control unit may itself generate the patterns or may receive the patterns from some other agent. The control unit 120 and the light sensing device 130 may be controlled by a common clock signal so that the light sensing device 130 can coordinate (synchronize) its action of capturing the samples $\{I_{MLS}(k)\}$ with the control unit's action of supplying spatial patterns to the light modulation unit 110. (System 100 may include clock generation circuitry.)

In some embodiment, the control unit 120 may supply the spatial patterns to the light modulation unit in a periodic fashion.

The control unit 120 may be a digital circuit or a combination of digital circuits. For example, the control unit may include a microprocessor (or system of interconnected of microprocessors), a programmable hardware element such as a field-programmable gate array (FPGA), an application specific integrated circuit (ASIC), or any combination such elements.

In some embodiments, the control unit 120 may include a random number generator (RNG) or a set of random number generators to generate the spatial patterns or some subset of the spatial patterns.

In some embodiments, system 100 is battery powered. In some embodiments, the system 100 includes a set of one or more solar cells and associated circuitry to derive power from sunlight.

In some embodiments, system 100 includes its own light source for illuminating the environment or a target portion of the environment.

In some embodiments, system 100 may include a display (or an interface configured for coupling to a display) for displaying constructed images/videos.

In some embodiments, system 100 may include one or more input devices (and/or, one or more interfaces for input devices), e.g., any combination or subset of the following devices: a set of buttons and/or knobs, a keyboard, a keypad, a mouse, a touch-sensitive pad such as a trackpad, a touch-sensitive display screen, one or more microphones, one or more temperature sensors, one or more chemical sensors, one or more pressure sensors, one or more accelerometers, one or more orientation sensors (e.g., a three-axis gyroscopic sensor), one or more proximity sensors, one or more antennas, etc.

Regarding the spatial patterns that are used to modulate the light stream L, it should be understood that there are a wide variety of possibilities. In some embodiments, the control unit 120 may be programmable so that any desired set of spatial patterns may be used.

In some embodiments, the spatial patterns are binary valued. Such an embodiment may be used, e.g., when the light modulating elements are two-state devices. In some embodiments, the spatial patterns are n-state valued, where each element of each pattern takes one of n states, where n is an integer greater than two. (Such an embodiment may be used, e.g., when the light modulating elements are each able to achieve n or more modulation states). In some embodiments, the spatial patterns are real valued, e.g., when each of the light modulating elements admits a continuous range of modulation. (It is noted that even a two-state modulating element may be made to effectively apply a continuous range of modulation by duty cycling the two states during modulation intervals.)

The spatial patterns may belong to a set of measurement vectors that is incoherent with a set of vectors in which the image/video is approximately sparse ("the sparsity vector set"). (See "Sparse Signal Detection from Incoherent Projections", Proc. Int. Conf. Acoustics, Speech Signal Processing—ICASSP, May 2006, Duarte et al.) Given two sets of vectors A={$a_i$} and B={$b_i$} in the same N-dimensional space, A and B are said to be incoherent if their coherence measure μ(A,B) is sufficiently small. The coherence measure is defined as:

$$\mu(A, B) = \max_{i,j} |\langle a_i, b_j \rangle|.$$

The number of compressive sensing measurements (i.e., samples of the sequence $\{I_{MLS}(k)\}$ needed to construct an N-pixel image (or N-voxel video sequence) that accurately represents the scene being captured is a strictly increasing function of the coherence between the measurement vector set and the sparsity vector set. Thus, better compression can be achieved with smaller values of the coherence.

In some embodiments, the measurement vector set may be based on a code. Any of various codes from information theory may be used, e.g., codes such as exponentiated Kerdock codes, exponentiated Delsarte-Goethals codes, run-length limited codes, LDPC codes, Reed Solomon codes and Reed Muller codes.

In some embodiments, the measurement vector set corresponds to a permuted basis such as a permuted DCT basis or a permuted Walsh-Hadamard basis, etc.

In some embodiments, the spatial patterns may be random or pseudo-random patterns, e.g., generated according to a random number generation (RNG) algorithm using one or more seeds. In some embodiments, the elements of each pattern are generated by a series of Bernoulli trials, where each trial has a probability p of giving the value one and probability 1-p of giving the value zero. (For example, in one embodiment p=½.) In some embodiments, the elements of each pattern are generated by a series of draws from a Gaussian random variable.)

The system 100 may be configured to operate in a compressive fashion, where the number of the samples $\{I_{MLS}(k)\}$ captured by the system 100 is less than (e.g., much less than) the number of pixels in the image (or video) to be constructed from the samples. In many applications, this compressive realization is very desirable because it saves on power consumption, memory utilization and transmission bandwidth consumption. However, non-compressive realizations are contemplated as well.

In some embodiments, the system 100 is configured as a camera or imager that captures information representing an image (or a series of images) from the external environment, e.g., an image (or a series of images) of some external object or scene. The camera system may take different forms in different applications domains, e.g., domains such as visible light photography, infrared photography, ultraviolet photography, high-speed photography, low-light photography, underwater photography, multi-spectral imaging, hyperspectral imaging, etc. In some embodiments, system 100 is configured to operate in conjunction with (or as part of) another system, e.g., in conjunction with (or as part of) a microscope, a telescope, a robot, a security system, a surveillance system, a fire sensor, a node in a distributed sensor network, etc.

In some embodiments, system 100 is configured as a spectrometer.

In some embodiments, system 100 is configured as a multi-spectral or hyper-spectral imager.

In some embodiments, system 100 may also be configured to operate as a projector. Thus, system 100 may include a light source, e.g., a light source located at or near a focal point of optical subsystem 117. In projection mode, the light modulation unit 110 may be supplied with an image (or a video sequence) so that the image (or video sequence) can be displayed on a display surface (e.g., screen).

In some embodiments, system 100 includes an interface for communicating with a host computer. The host computer may send control information and/or program code to the system 100 via the interface. Furthermore, the host computer may receive status information and/or compressive sensing measurements from system 100 via the interface.

Figure 3A:
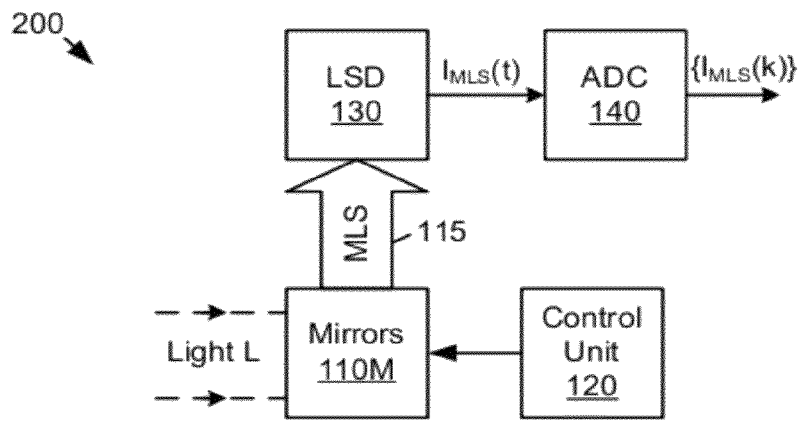
FIG. 3A illustrates system 200, where the light modulation unit 110 is realized by a plurality of mirrors (collectively referenced by label 110M).

In one realization 200 of system 100, the light modulation unit 110 may be realized by a plurality of mirrors, e.g., as shown in FIG. 3A. (The mirrors are collectively indicated by the label 110M.) The mirrors 110M are configured to receive corresponding portions of the light L received from the environment, albeit not necessarily directly from the environment. (There may be one or more optical elements, e.g., one or more lenses along the input path to the mirrors 110M.) Each of the mirrors is configured to controllably switch between two orientation states. In addition, each of the mirrors is configured to (a) reflect the corresponding portion of the light onto a sensing path 115 when the mirror is in a first of the two orientation states and (b) reflect the corresponding portion of the light away from the sensing path when the mirror is in a second of the two orientation states.

In some embodiments, the mirrors 110M are arranged in an array, e.g., a two-dimensional array or a one-dimensional array. Any of various array geometries are contemplated. For example, in different embodiments, the array may be a square array, a rectangular array, a hexagonal array, etc. In some embodiments, the mirrors are arranged in a spatially-random fashion.

The mirrors 110M may be part of a digital micromirror device (DMD). For example, in some embodiments, one of the DMDs manufactured by Texas Instruments may be used.

The control unit 120 may be configured to drive the orientation states of the mirrors through the series of spatial patterns, where each of the patterns of the series specifies an orientation state for each of the mirrors.

The light sensing device 130 may be configured to receive the light portions reflected at any given time onto the sensing path 115 by the subset of mirrors in the first orientation state and to generate an analog electrical signal representing $I_{MLS}(t)$ representing a cumulative intensity of the received light portions as function of time. As the mirrors are driven through the series of spatial patterns, the subset of mirrors in the first orientation state will vary from one spatial pattern to the next. Thus, the cumulative intensity of light portions reflected onto the sensing path 115 and arriving at the light sensing device will vary as a function time. Note that the term "cumulative" is meant to suggest a summation (spatial integration) over the light portions arriving at the light sensing device at any given time. This summation may be implemented, at least in part, optically (e.g., by means of a lens and/or mirror that concentrates or focuses the light portions onto a concentrated area as described above).

Figure 3B:
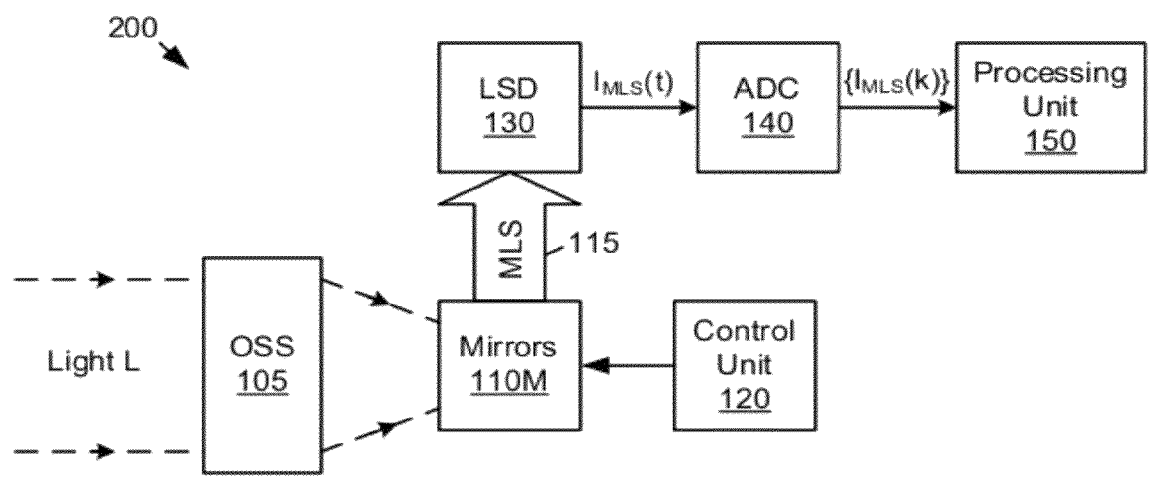
FIG. 3B shows an embodiment of system 200 that includes the processing unit 150.

System realization 200 may include any subset of the features, embodiments and elements discussed above with respect to system 100. For example, system realization 200 may include the optical subsystem 105 to operate on the incoming light L before it arrives at the mirrors 110M, e.g., as shown in FIG. 3B.

Figure 4:
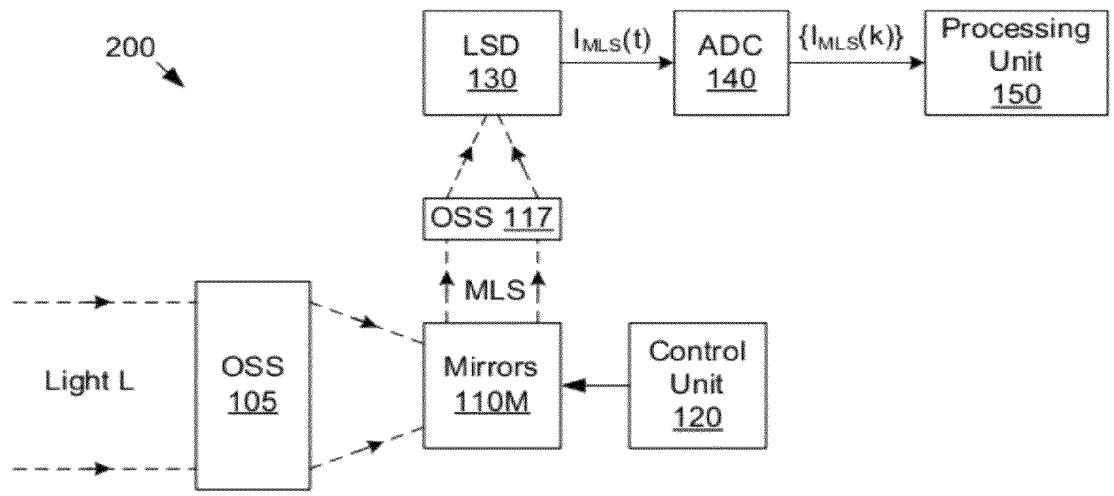
FIG. 4 shows an embodiment of system 200 that includes the optical subsystem 117 to direct or focus or concentrate the modulated light stream MLS onto the light sensing device 130.
Figure 5A:
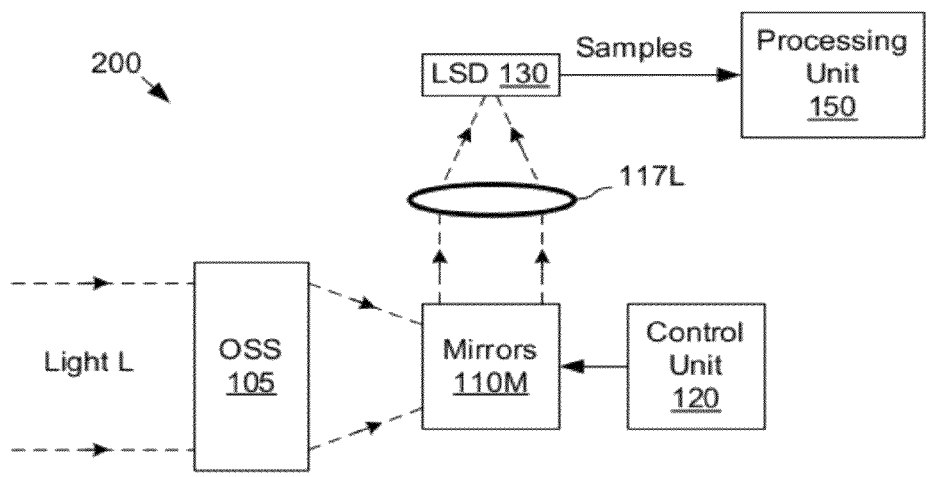
FIG. 5A shows an embodiment of system 200 where the optical subsystem 117 is realized by the lens 117L.

In some embodiments, system realization 200 may include the optical subsystem 117 along the sensing path as shown in FIG. 4. The optical subsystem 117 receives the light portions reflected onto the sensing path 115 and directs (e.g., focuses or concentrates) the received light portions onto a light sensing surface (or surfaces) of the light sensing device 130. In one embodiment, the optical subsystem 117 may include a lens 117L, e.g., as shown in FIG. 5A.

Figure 5B:
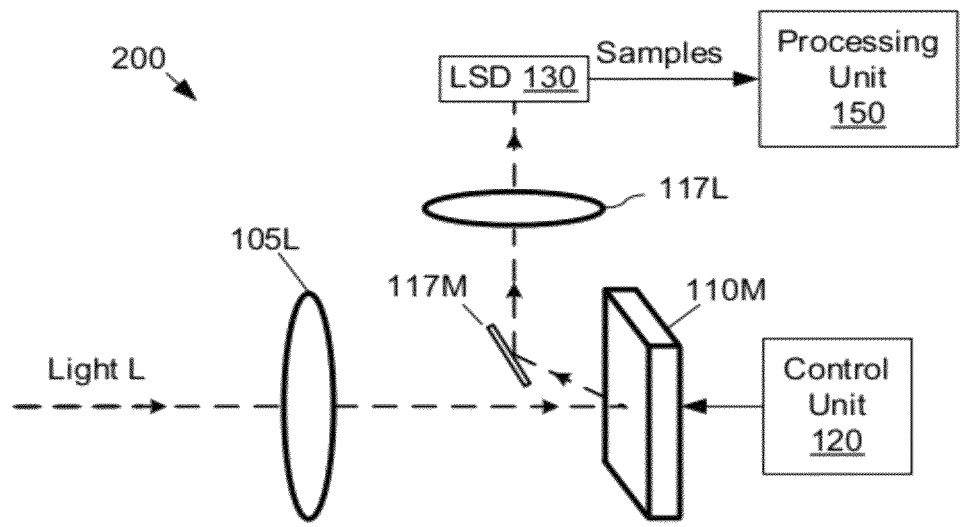
FIG. 5B shows an embodiment of system 200 where the optical subsystem 117 is realized by a mirror 117M and lens 117L in series.

In some embodiments, the optical subsystem 117 may include one or more mirrors, e.g., a mirror 117M as shown in FIG. 5B. Thus, the sensing path may be a bent path having more than one segment. FIG. 5B also shows one possible embodiment of optical subsystem 105, as a lens 105L.

Figure 5C:
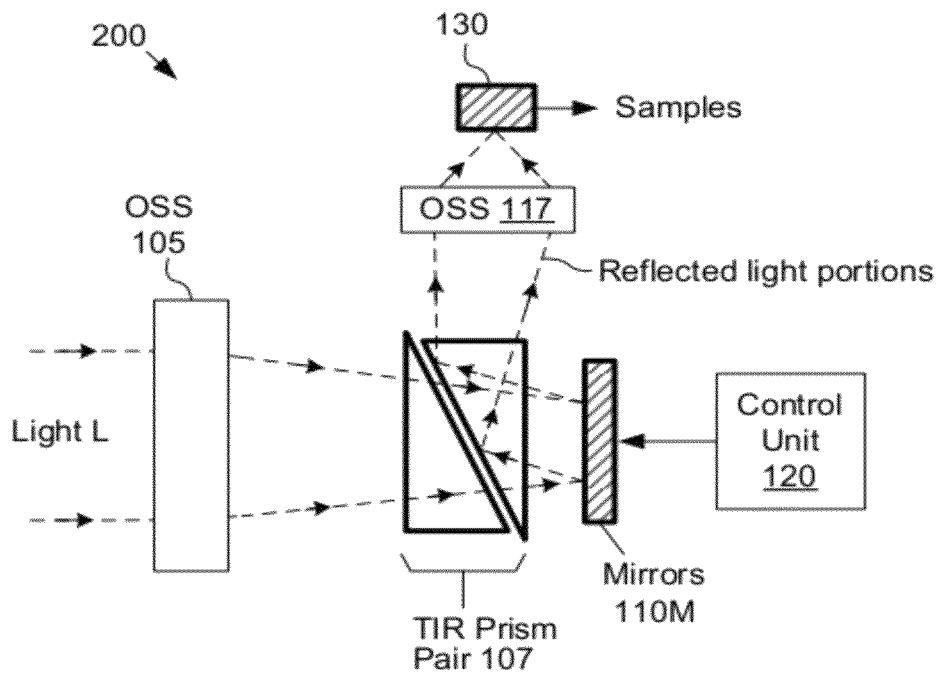
FIG. 5C shows another embodiment of system 200 that includes a TIR prism pair 107.

In some embodiments, there may be one or more optical elements intervening between the optical subsystem 105 and the mirrors 110M. For example, as shown in FIG. 5C, a TIR prism pair 107 may be positioned between the optical subsystem 105 and the mirrors 110M. (TIR is an acronym for "total internal reflection".)

Light from optical subsystem 105 is transmitted through the TIR prism pair and then interacts with the mirrors 110M. After having interacted with the mirrors 110M, light portions from mirrors in the first orientation state are reflected by a second prism of the pair onto the sensing path 115. Light portions from mirrors in the second orientation state may be reflected away from the sensing path.

Acquiring Samples Restricted to Steady State Intervals

Figure 6:
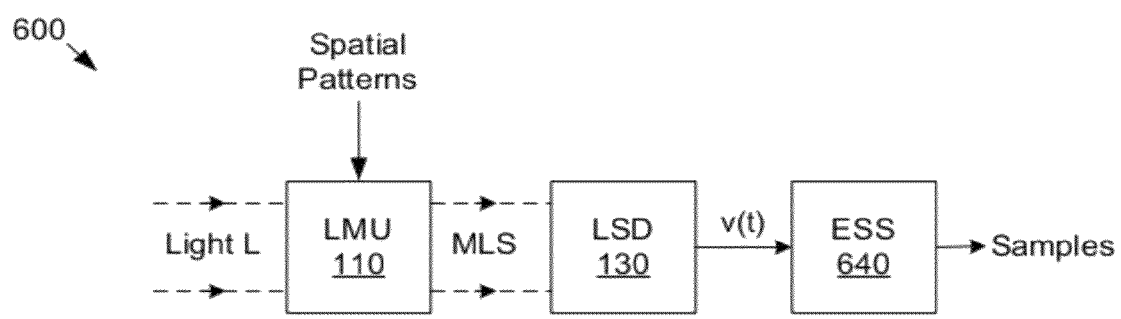
FIG. 6 illustrates one embodiment of a system 600 for acquiring samples corresponding to the steady state portions of pattern modulation periods.

In one set of embodiments, a system 600 for operating on light may be configured as shown in FIG. 6. System 600 may include the light modulation unit 110 and the light sensing device 130 as described above, and may also include an electronic subsystem 640. (Furthermore, system 600 may include any subset of the features, embodiments and elements described above.)

The light modulation unit 110 is configured to produce a modulated light stream MLS by modulating an incident stream of light L with a sequence of spatial patterns. The light modulation unit 110 may be realized in any of the various ways described above. The light modulation unit includes an array of light modulating elements. Let N denote the number of light modulation element in the array. In various embodiments, the number N may take a wide variety of values. For example, in different sets of embodiments, N may be, respectively, in the range [64, 256], in the range [256, 1024], in the range [1024,4096], in the range $[2^{12}, 2^{14}]$, in the range $[2^{14}, 2^{16}]$, in the range $[2^{16}, 2^{18}]$, in the range $[2^{18}, 2^{20}]$, in the range $[2^{20}, 2^{22}]$, in the range $[2^{22}, 2^{24}]$, in the range $[2^{24}, 2^{26}]$, in the range from $2^{26}$ to infinity. The particular value used in any given embodiment may depend on one or more factors specific to the embodiment.

The light sensing device 130 may be configured to receive the modulated light stream and to generate an electrical signal that represents intensity of the modulated light stream as a function of time. The light sensing device may be realized in any of the various ways described above.

FIG. 6 shows the modulated light stream proceeding directly from the light modulation unit 110 to the light sensing device 130. However, that feature is not meant to be limiting. Indeed, in many embodiments of system 600, there is an optical subsystem intervening between the light modulation unit and the light sensing device, e.g., the optical subsystem 117 as variously described above.

As variously described above, the array of light modulating elements modulate the incident light stream as specified by the sequence of spatial patterns. Each spatial pattern is an array of modulation control values, one control value per light modulating element. During the period of time when a given spatial pattern is being applied by the light modulation unit 110, each light modulating element effectively multiplies the intensity of a corresponding spatial portion of the incident light stream by a scalar value determined by the corresponding control value of the given spatial pattern. Thus, at any given time the modulated light stream is an ensemble of scaled light portions, and the intensity S(t) of the modulated light stream is a summation of the intensities of the scaled light portions.

Figure 7:
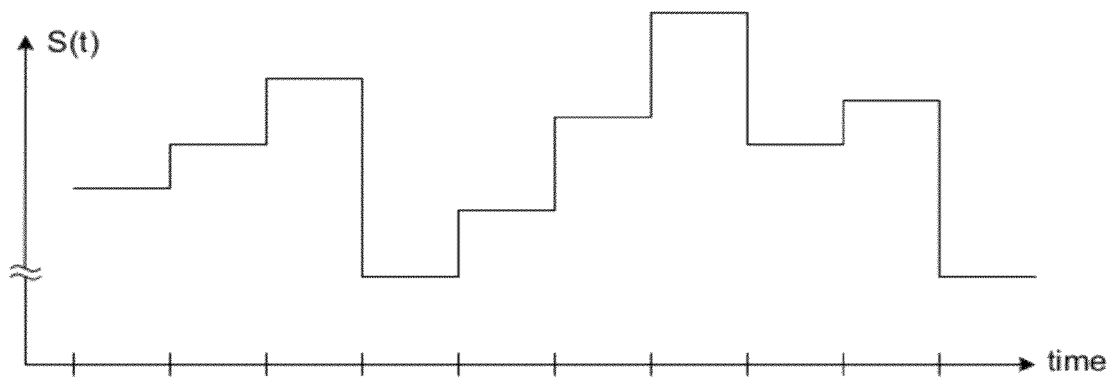
FIG. 7 illustrates an idealized waveform for the intensity S(t) of the modulated light stream from the light modulation unit.
Figure 8A:
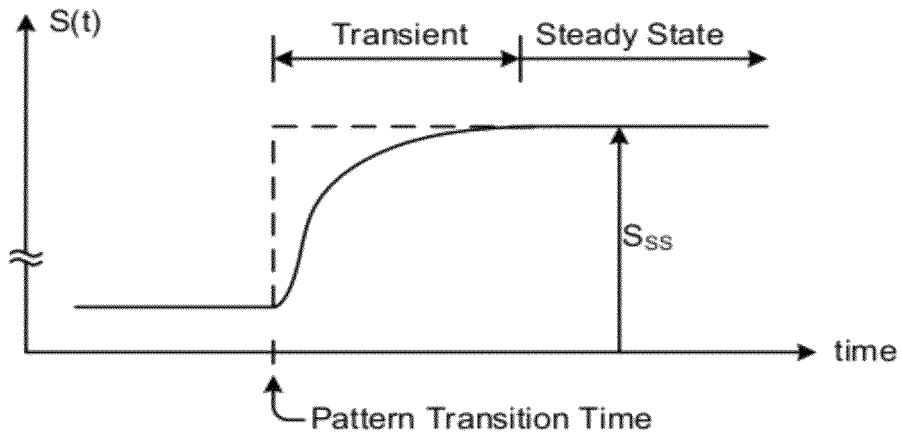
FIGS. 8A-C illustrate a few examples of the possible types of transients that might occur in the light intensity signal S(t) upon pattern transitions.
Figure 8B:
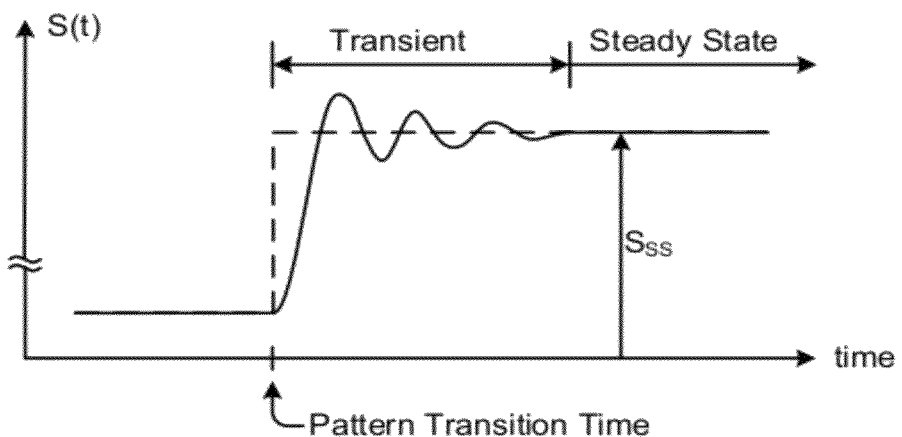
Figure 8C:
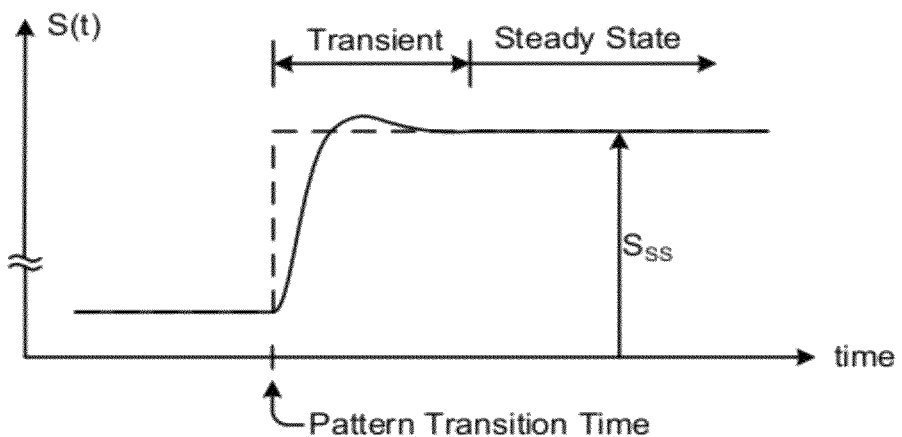

Naively, one might imagine the intensity of the modulated light stream to be a piecewise-constant signal shown in FIG. 7, where step transitions between light-intensity levels occur upon transitions from one spatial pattern to the next. However, any real array of light modulating elements will exhibit transient behavior upon the pattern transitions. FIGS. 8A-C show a few of the kinds of transient behavior that might occur upon pattern transitions. (These examples are not meant to be limiting. Indeed, the design principles described herein apply to systems exhibiting any kind of transient behavior.) Observe that the transient, i.e., the difference between the intensity signal S(t) and its steady state value $S_{SS}$, decays to zero (or, to within an acceptably small value) after an amount of time that depends on the physical and electrical parameters of the light modulation unit 110. Thus, even if the light sensing device 130 were perfectly responsive (zero settling time) to the intensity signal S(t)), the electrical signal v(t) would exhibit transient behavior. However, the light sensing device is not perfectly responsive. Indeed, the light sensing device may have a settling time that is larger than the settling time of the light modulation unit. (The settling time of an input-output device is the amount of time required for the output to converge to within given distance of its steady state value in response to a step transition at the input.) For example, in addition to a light sensing element, the light sensing device may include (or couple to) an amplifier having limited bandwidth.

Figure 9:
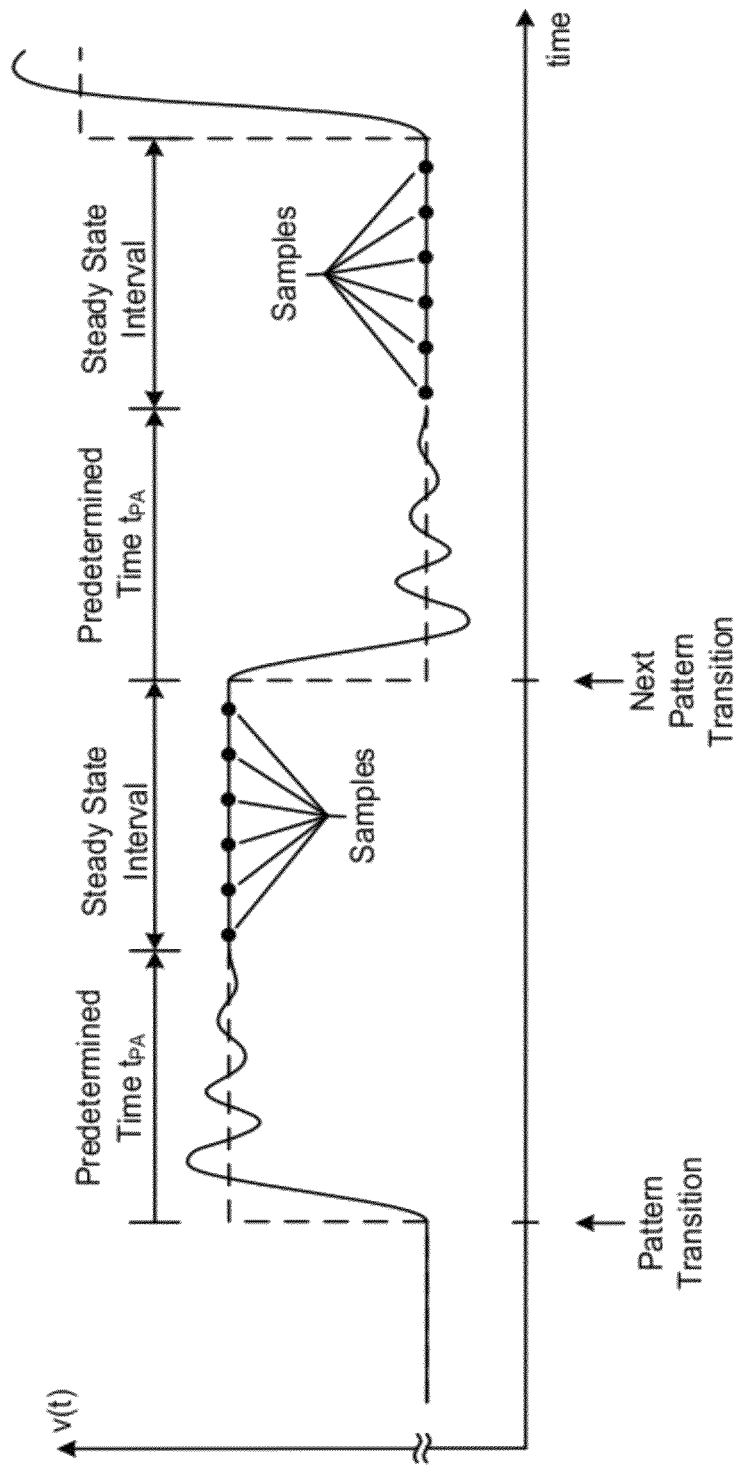
FIG. 9 illustrates the process of acquiring samples restricted to steady-state intervals, according to one set of embodiments.

The electronic subsystem 640 is configured to obtain samples of the electrical signal that are restricted to steady state intervals of the electrical signal. Each of the steady state intervals is a time interval that (a) starts a predetermined amount of time $t_{PA}$ after a corresponding transition from a corresponding one of said spatial patterns to a next one of said spatial patterns and (b) ends before a corresponding next transition of the sequence of spatial patterns. FIG. 9 illustrates the notion of "steady state intervals", and the notion of samples being restricted to the steady state intervals. The specific type and duration of transient response shown in FIG. 9 is not meant to be limiting. Furthermore, it is not generally necessary that the same number of samples be acquired in each steady state interval. In those embodiments that do involve acquiring the same number of samples in each steady state interval, the number (five) shown in FIG. 9 is not meant to be limiting. Any number of samples per steady state interval may be acquired.

In some embodiments, the time $t_{PA}$ is greater than or equal to a settling time of the electrical signal in response to each of the transitions (or a generic one of the transitions).

In some embodiments, the time $t_{PA}$ is greater than or equal to a time required for a transient (in the electrical signal), generated in response to each spatial pattern transition, to decay to a predetermined sufficiently small value. For example, the time $t_{PA}$ may be set equal to a time required for the transient induced by each of (or a generic one of) the spatial pattern transitions to decay to within a fractions of the size of the step in steady state values induced by the transition. (The steady state step induced by a given transition is the steady state value of the electrical signal v(t) after the transition minus the steady state value before the transition.) In another embodiment, the time $t_{PA}$ may be set equal to a time required for the transient induced by each of the spatial pattern transitions to decay to within a fractions of an RMS value of the steady state steps induced by the respective transitions. The value of fractions may be different in different embodiments. In different sets of embodiments, the fractions may be, respectively, in the range $[10^{-12}, 10^{-5}]$, in the range $[10^{-5}, 10^{-4}]$, in the range $[10^{-4}, 0.001]$, in the range [0.001, 0.01], in the range [0.01,0.05], in the range [0.05,0.1], in the range [0.1, 0.2], in the range [0.2,0.3], in the range [0.3,0.4].

The time $t_{PA}$ is less than the pattern modulation period $T_P$ (the amount of time between successive pattern transitions, or equivalently, the reciprocal of the pattern modulation rate). In different embodiments, the ratio $t_{PA}/T_P$ may take different values. For example, in different sets of embodiments, the ratio $t_{PA}/T_P$ may be, respectively, in the range $[10^{-4}, 0.001]$, in the range [0.001,0.01], in the range [0.01,0.1], in the range [0.1,0.2], in the range [0.2,0.3], in the range [0.3,0.4], in the range [0.4,0.5], in the range [0.5,0.6], in the range [0.6,0.7], in the range [0.7,0.8], in the range [0.8,0.9], in the range [0.9, 1.0).

In some embodiments, the time $t_{PA}$ may be a programmable parameter.

The electronic subsystem 640 includes at least one analog-to-digital converter (ADC), e.g., the ADC 140 described above, in order to capture the samples of the electrical signal. In some embodiments, the electronic subsystem 640 may also include one or more analog circuits and/or one or more digital circuits, e.g., analog circuits for preprocessing the electrical signal prior to sampling, and/or, digital circuits for operating on the acquired samples in any of various ways. In some embodiments, the electronic subsystem 640 may include one or more microprocessors that operates under program control, and/or, one or more FPGAs, and/or, one or more custom-designed circuits. Any of the various functions ascribed to the electronic subsystem 640 may be performed using any one (or any combination) of these hardware options.

In some embodiments, the electronic subsystem 640 is configured to obtain the samples so that they correspond to M of the spatial patterns and are useable to construct an n-pixel image or n-voxel video sequence that represents the incident light stream. The numbers M and n are positive integers; M is smaller than n; and n is less than or equal to N. (Recall that N is the number of light modulating elements in the light modulation unit 110.) (The number of "voxels" in a video sequence is the number of images in the video sequence times the number of pixels per image, or equivalently, the sum of the pixel counts of the images in the video sequence.)

In some embodiments, system 600 may be configured to perform the image/video construction process. Alternatively, or additionally, system 640 may transmit the samples to another system so that other system may perform the image/video construction process.

In various embodiments, the compression ratio M/n may take any of a wide variety of values. For example, in different sets of embodiments, M/n may be, respectively, less than or equal to 0.9, less than or equal to 0.8, less than or equal to 0.7, less than or equal to 0.6, less than or equal to 0.5, less than or equal to 0.4, less than or equal to 0.3, less than or equal to 0.2, less than or equal to 0.1, less than or equal to 0.05, less than or equal to 0.025, less than or equal to 0.01.

As noted above, the final image may be an n-pixel image with n≤N. The spatial patterns may be designed to support a value of n less than N, e.g., by forcing the array of light modulating elements to operate at a lower effective resolution than the physical resolution N. For example, the spatial patterns may be designed to force each 2×2 cell of light modulating elements to act in unison. At any given time, the modulation state of the four elements in a 2×2 cell will agree. Thus, the effective resolution of the array of light modulating elements is reduced to N/4. This principle generalizes to any cell size, to cells of any shape, and to collections of cells with non-uniform cell size and/or cell shape. For example, a collection of cells of size $k_H \times k_V$, where $k_H$ and $k_V$ are positive integers, would give an effective resolution equal to $N/(k_H k_V)$. In one alternative embodiment, cells near the center of the array may have smaller sizes than cells near the periphery of the array.

Another way the spatial patterns may be arranged to support the construction of an n-pixel image with n less than N is to allow the spatial patterns to vary only within a subset of the array of light modulating elements. Outside that subset the spatial patterns would be null (take the value zero). Thus, light modulating elements corresponding to positions outside of the subset would not send any light (or send only the minimum amount of light attainable) to the light sensing device. Thus, the reconstructed image would be restricted to the subset. In some embodiments, each spatial pattern may be multiplied element-wise by a binary mask, and the resulting product pattern may be supplied to the light modulation unit.

In some embodiments, the subset is a contiguous region of the array of light modulating elements, e.g., a rectangle or a circular disk. In some embodiments, the size and/or position of the region may vary, e.g., dynamically.

In some embodiments, the samples acquired by electronic subsystem 640 include two or more samples for each of the spatial patterns. For example, the rate of a sampling clock used by the electronic subsystem 640 may be sufficiently high in relation to the rate of the pattern clock used by the light modulation unit 110 to guarantee that two or more samples are acquired during each steady-state interval.

In some embodiments, the electronic subsystem 640 is configured to generate a sequence of refined values, including one refined value per spatial pattern, by averaging the two or more samples for each spatial pattern to obtain a corresponding one of the refined values. M of the refined values are usable to construct an n-pixel image or an n-voxel video sequence representing the incident light stream, wherein M and n are positive integers, wherein M is smaller than n.

Figure 10:
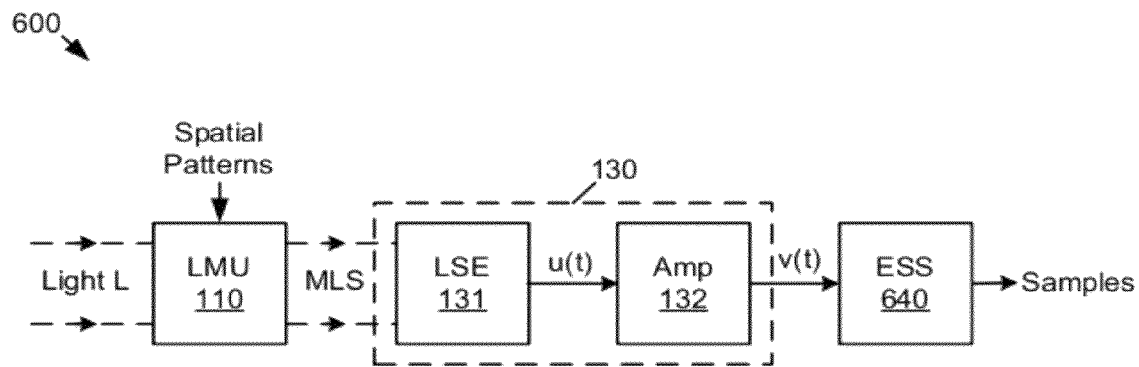
FIG. 10 illustrates an embodiment of system 600, wherein the light sensing device 130 includes an amplifier 132.

In some embodiments, the light sensing device 130 includes a light sensing element 131 and an amplifier 132, e.g., as shown in FIG. 10. The light sensing element 131 is configured to generate an electrical signal u(t) that represents intensity of the modulated light stream as a function of time. (The light sensing element may be realized in any of the various ways described above. For example, the light sensing element may be a photodiode.) The amplifier 132 is configured to amplify the electrical signal u(t) to obtain the electrical signal v(t).

In some embodiments, the amplifier 132 includes a transimpedance amplifier.

In some embodiments, the time $t_{PA}$ discussed above is greater than or equal to a settling time of the amplifier 132. The settling time of the amplifier 132 may be larger (perhaps significantly larger) than the settling time of the light intensity signal S(t) or the settling time of the electrical signal u(t).

In some embodiments, the time $t_{PA}$ is determined based on a bandwidth of the amplifier 132. In general, a wider bandwidth implies a shorter settling time (or time constant) for the amplifier, and thus, the time $t_{PA}$ may be set to a smaller value.

Suppose that the light modulation unit 110 modulates the incident light stream with the sequence of spatial patterns at a rate of $R_P = 1/T_P$ patterns per second, where $T_P$ is a pattern modulation period. The amplifier 132 may be configured to have a settling time $t_{SA}$ that is less than the pattern modulation period $T_P$. In different embodiments, the ratio $t_{SA}/T_P$ may be, respectively, in the range [0.0001,0.001], in the range [0.001, 0.01], in the range [0.01,0.1], in the range [0.1,0.2], in the range [0.2,0.3], in the range [0.3,0.4], in the range [0.4,0.5], in the range [0.5,0.6], in the range [0.6,0.7], in the range [0.7, 0.8], in the range [0.8,0.9], in the range [0.9,1.0).

In some embodiments, the electronic subsystem 640 is configured to continuously acquire raw samples of the electrical signal during a light acquisition period, and to remove subsets of the raw samples that do not belong to the steady state intervals in order to obtain the samples that are restricted to the steady-state intervals. (The light acquisition period may be sufficiently long so that the light modulation unit 110 applies M spatial patterns to the incident light stream, where M is the number of inner products required to construct an n-pixel image or n-voxel video. In some embodiments, system 600 is configured for continuous image/video capture, and thus, the light acquisition period is practically infinite.)

Figure 11:
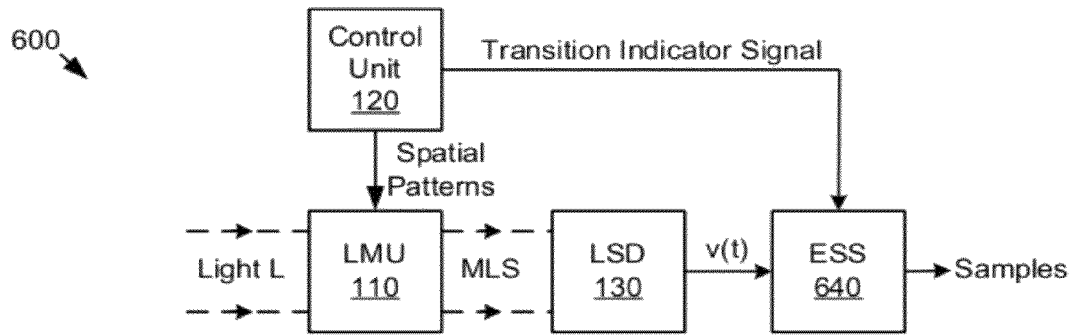
FIG. 11 illustrates an embodiment of system 600, where control unit 120 provides a transition indicator signal to the electronic subsystem 640.

In some embodiments, the electronic subsystem 640 may receive a transition indicator signal, e.g., from the control unit 120 as described above and illustrated in FIG. 11. The electronic subsystem may remove raw samples during transient intervals. Each of the transient intervals begins at a corresponding assertion (e.g., active edge) of the transition indictor signal and lasts for the time $t_{P4}$. The transition indicator signal indicates when the spatial pattern transition occurs.

Figure 12:
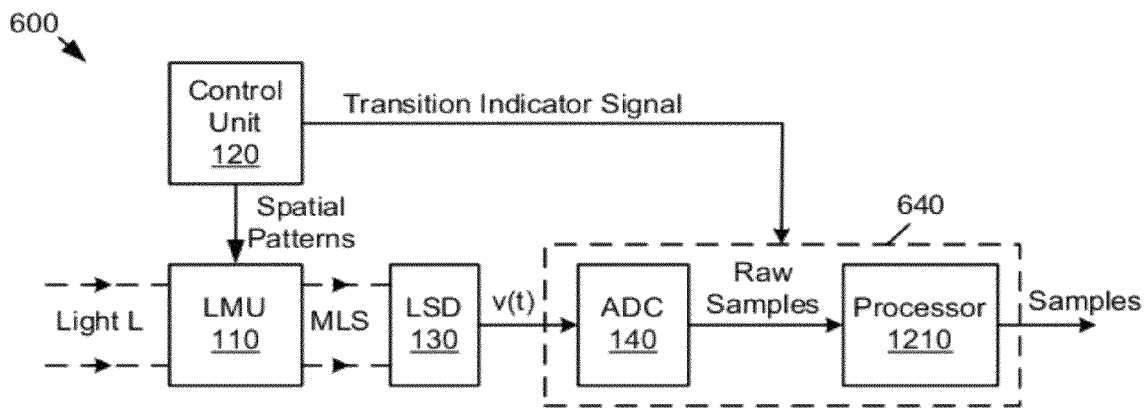
FIG. 12 illustrates an embodiment of system 600, where processor 1210 acquires raw samples and discards any that don't belong to the steady-state intervals.

In some embodiments, the electronic subsystem 640 may include a processor 1210 (e.g., a microprocessor) configured to execute program instructions, e.g., as illustrated in FIG. 12. The program instructions, when executed by the processor, may cause the processor to perform the action of removing of the subsets of the raw samples that do not belong to the steady state intervals. In addition to the raw samples, the processor 1210 may receive information indicating when the spatial patterns transitions occur.

In an alternative embodiment, the removal of the subsets of the raw samples that do not belong to the steady state intervals may be performed by specialized digital circuitry.

In some embodiments, the electronic subsystem 640 is configured to sample the electrical signal v(t) at a rate of $R_S$ samples per second, and the light modulation unit is configured to modulate the incident light stream with the sequence of spatial patterns at a rate of $R_P$ patterns per second, where the sample rate $R_S$ is an integer multiple of the pattern rate $R_P$, i.e., $R_S/R_P$ is a positive integer.

In some embodiments, the sample rate $R_S$ and pattern rate $R_P$ are equal. Thus, one steady state sample may be acquired per spatial pattern.

In various embodiments, the sample rate $R_S$ or the pattern rate $R_P$ or both may be programmable. System 600 may include clock generation and clock-rate division circuitry.

In some embodiments, the electronic subsystem 640 is configured so that the sample rate $R_S$ is greater than, but not an integer multiple of, the pattern rate $R_P$.

In some embodiments, the electronic subsystem 640 includes the ADC 140 and timing control unit 1310, e.g., as shown in FIG. 13. The ADC 140 is configured to sample the electrical signal when enabled by a timing control signal (TCS) provided by the timing control unit 1310. The timing control unit is configured to enable sampling during the steady-state intervals and disable sampling outside the steady-state intervals. The timing control unit may receive the transition indicator signal as described above from the control unit 120.

The timing control unit 1310 may include a digital counter and a comparator. The digital counter is configured to increment in response to edges of a clock signal (e.g., an A/D conversion clock signal). The comparator is configured to compare a current value of the counter to a value stored in a register. The output of the comparator may be used to control the state of the timing control signal. The register value is preferably programmable.

In some embodiments, the timing control unit 1310 is realized by a microcontroller. In some embodiments, the timing control unit is realized in an FPGA.

In one set of embodiments, a method 1400 for operating on light may involve the actions shown in FIG. 14A. The method 1400 may be performed using system 600, in any of its various embodiments.

Action 1410 includes modulating an incident light stream with a sequence of spatial patterns to obtain a modulated light stream, e.g., as variously described above.

Action 1420 includes generating an electrical signal that represents intensity of the modulated light stream as a function of time, e.g., as variously described above.

Action 1430 includes obtaining samples of the electrical signal that are restricted to steady state intervals of the electrical signal, e.g., as variously described above. Each of the steady state intervals is a time interval that (a) starts a predetermined amount of time after a corresponding transition from a corresponding one of said spatial patterns to a next one of said spatial patterns and (b) ends before a corresponding next transition of the sequence of spatial patterns. The samples correspond to M of the spatial patterns and are usable to construct an n-pixel image or n-voxel video sequence that represents the incident light stream, where M and n are positive integers, where M is smaller than n. The number M and n may take any of a wide variety of values and combinations of values, e.g., as variously described above.

In some embodiments, the method 1400 also includes operating on the samples to construct the n-pixel image or n-voxel video sequence.

In some embodiments, the samples obtained at 1430 include two or more samples for each of the spatial patterns.

In some embodiments, the method 1400 may also include generating a sequence of refined values, including one refined value per spatial pattern. The sequence of refined values may be generated by averaging the two or more samples for each spatial pattern to obtain a corresponding one of the refined values. The refined values are usable to construct the n-pixel image or n-voxel video sequence.

In some embodiments, the method 1400 also includes amplifying the electrical signal to obtain an amplified signal. In these embodiments, the samples of the electrical signal obtained at 1430 are samples of the amplified signal.

In some embodiments, the action 1430 of obtaining the samples includes: continuously acquiring raw samples of the electrical signal during a light acquisition period; and removing subsets of the raw samples that do not belong to the steady state intervals, e.g., as variously described above.

In some embodiments, the action of removing subsets of the raw samples is performed by a processor in response to execution of program instructions.

In some embodiments, the action 1430 of obtaining the samples of the electrical signal includes enabling sample acquisition by an A/D converter during the steady-state intervals, and disabling sample acquisition by the A/D converter outside the steady-state intervals.

Avoiding Noise Associated with the DMD Mirror Transitions

Figure 14B:
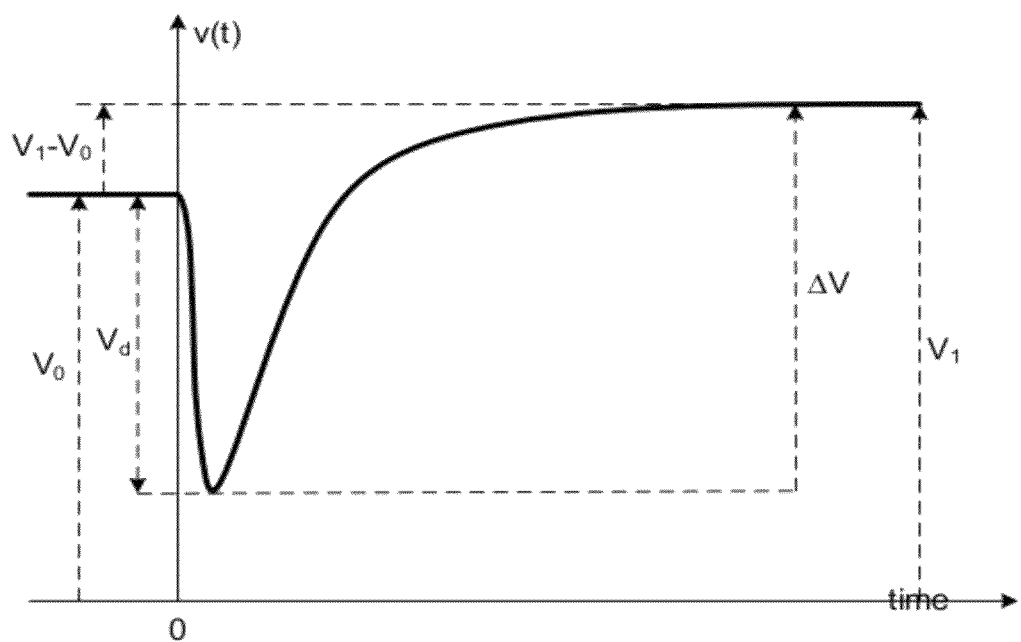
FIG. 14B illustrates an example of pattern-transition transient in the electrical signal v(t).

In some embodiments, the light modulation unit 110 is a digital micromirror device (DMD). As the mirrors of the DMD change (flip) their orientations at each time of transition between spatial patterns, the mirrors can ring or oscillate before they settle into a stable mechanical state. Thus, the intensity S(t) of the modulated light stream received by the light sensing device 130 may exhibit a transient oscillation at each pattern transition. Furthermore, the intensity S(t) may exhibit a spike at each pattern transition. Thus, in the neighborhood of a pattern transition, the electrical signal v(t) produced by the amplifier of FIG. 10 may in some embodiments resemble the curve of FIG. 14B. The signal v(t) starts at a steady state value $V_0$, undergoes a rapid displacement at the pattern transition time (t=0) due to the spike in the intensity S(t), and then, converges to a new steady state $V_1$ determined by the new configuration of the micromirror array. The displacement may be of the same order of magnitude as the steady state values $V_0$ and $V_1$. (It is noted that the negative-going nature of the pattern-transition spike depicted in FIG. 14B is not meant to be limiting. In other embodiments, the pattern-transition spike might be positive-going.)

If the amplifier is modeled as a first-order lowpass filter, the signal v(t) for t>0 may be modeled by the expression:

$$v(t) = V_1 - \Delta V \exp(-t/\tau),$$

where $\Delta V$ is defined as shown in FIG. 14B, and where $\tau$ is the time constant of the amplifier. The quantity $\Delta V$ is of the order of the full scale of v(t) and may have significant random and/or pattern-dependent content. It may take multiple time constants for the transient $v(t)-V_1$ to die out. Any measurements taken before the transient has decayed to a sufficiently small value do not accurately reflect the information signal (the inner product of the image with the currently-asserted spatial pattern). The pattern modulation period (the time between successive pattern transitions) imposes a maximum on the amount of time allowed from the transient to die out, and thus, a minimum on the bandwidth of the amplifier. In other words, the transient should decay to a sufficiently small value before the next pattern transition. Suppose we require $$|v(t)-V_1| << |V_1-V_0|.$$

But $$|v(t)-V_1| = |\Delta V|\exp(-t/\tau).$$

So the inequality may be equivalently expressed as $$|\Delta V|\exp(-t/\tau) << |V_1-V_0|$$

If $\Delta V \approx V_0$ (which seems conservative based on observations of one DMD), and we assume that the RMS value of $|V_1-V_0|$ taken over many pattern transitions is $V_0/\sqrt{N}$, where N is the number of micromirrors in the DMD, then one obtains:

$$\exp(-t/\tau) \ll 1/\sqrt{N},$$

or equivalently, $$\tau \ll \frac{2t}{\ln(N)}.$$

Thus, as an amplifier design method, we may select a desired wait time $t_W$ which is less than or equal to the pattern modulation period (the reciprocal of the pattern modulation rate). Then an amplifier may be selected so that its time constant $\tau$ obeys $\tau << 2t_W/\ln(N)$. Furthermore, a compressive imaging system such as the system of FIG. 10 may be configured to wait for time $t_W$ after each pattern transition and then acquire samples during the remaining portion of the pattern modulation period. (As described above, the system may continuously acquire samples an discard those samples that correspond to the initial wait interval in each pattern modulation period.)

As a numerical example, if N=1E6 micromirrors and t=30 usec, the above inequality requires $\tau$<<4.3 usec, or equivalently t/$\tau$>>ln(N)/2=6.9. Thus, one should wait significantly more than 7 time constants for the transient to die out. Suppose we pick $\tau$=1 usec; the corresponding analog bandwidth for the amplifier is then 160 kHz, according to the following well-known relation between time constant $\tau$ and bandwidth B which is relevant for first-order filters: B=1/(2$\pi\tau$).

In one embodiment, the pattern modulation period is about 30 usec. So if we wait say 20 usec, then acquire for last 10 usec of each pattern modulation period, we should safely avoid any issues with the time constant.

Averaging Two or More Measurements Per Spatial Pattern to Reduce Noise

Figure 15A:
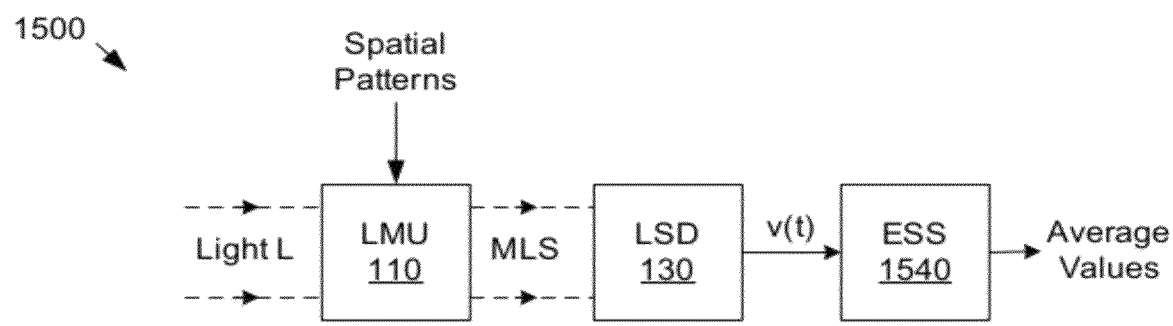
FIG. 15A illustrates an embodiment of a system 1500 for reducing noise by averaging two or more samples per spatial pattern.

In one set of embodiments, a system 1500 may be configured as shown in FIG. 15A. System 1500 may include the light modulation unit 110 and the light sensing device 130 as variously described above, and may also include electronic subsystem 1540. (Furthermore, system 1500 may include any subset of the features, embodiments and elements described above.)

The light modulation unit 110 is configured to produce a modulated light stream by modulating an incident stream of light L with a sequence of spatial patterns, e.g., as variously described above.

The light sensing device 130 is configured to generate an electrical signal v(t) that represents intensity of the modulated light stream as a function of time, e.g., as variously described above.

The electronic subsystem 1540 is configured to sample the electrical signal in order to obtain a first sequence of samples $\{I_1(k)\}$. The first sequence of samples includes two or more samples corresponding to each of the spatial patterns. Samples are said to "correspond" to a spatial pattern when they are acquired during the interval of time when the spatial pattern is being applied to the incident light stream by the light modulation unit 110.

The electronic subsystem 1540 includes at least one analog-to-digital converter (ADC), e.g., the ADC 140 described above, in order to capture the samples of the electrical signal. In some embodiments, the electronic subsystem 1540 may also include one or more analog circuits and/or one or more digital circuits, e.g., analog circuits for preprocessing the electrical signal prior to sampling, and/or, digital circuits for operating on the acquired samples.

The electronic subsystem 1540 is configured to generate a sequence of average values $\{I_{AVG}(k)\}$, including one average value $I_{AVG}(k)$ per spatial pattern, by averaging the two or more samples corresponding to each of the spatial patterns to obtain a corresponding one of the average values. A set of M of the average values are usable to construct an n-pixel image or n-voxel video sequence representing the incident light stream. M and n are positive integers, and M is smaller than n. The integer n and the compression ratio M/n may take any of wide variety of values, e.g., as variously described above.

In some embodiments, the action of constructing the image or video may be perform by system 1500 (e.g., by a microprocessor included in the electronic subsystem 1540, i.e., a microprocessor operating under program control.) Alternatively, or additionally, the constructing action may be performed by some other system, in which case, system 1500 is configured to transmit the average values to the other system, e.g., as variously described above.

The electronic subsystem 1540 may be configured according to any of the above-described embodiments of electronic subsystem 640, and may include any subset of the properties, features and elements described above in connection with electronic subsystem 640. In particular, electronic subsystem 1540 may be configured to obtain the two or more samples per spatial pattern during the steady state intervals as described above. (For example, see FIG. 9.)

In some embodiments, the electronic subsystem 1540 may include the processing unit 150 as variously described above. The processing unit 150 may be configured to perform the averaging computation. In one embodiment, the processing unit 150 includes a microprocessor that is configured execute program instructions. The processing unit 150 may perform the averaging computation under program control. In an alternative embodiment, the processing unit 150 includes specialized digital circuitry for performing the averaging computation.

Figure 15B:
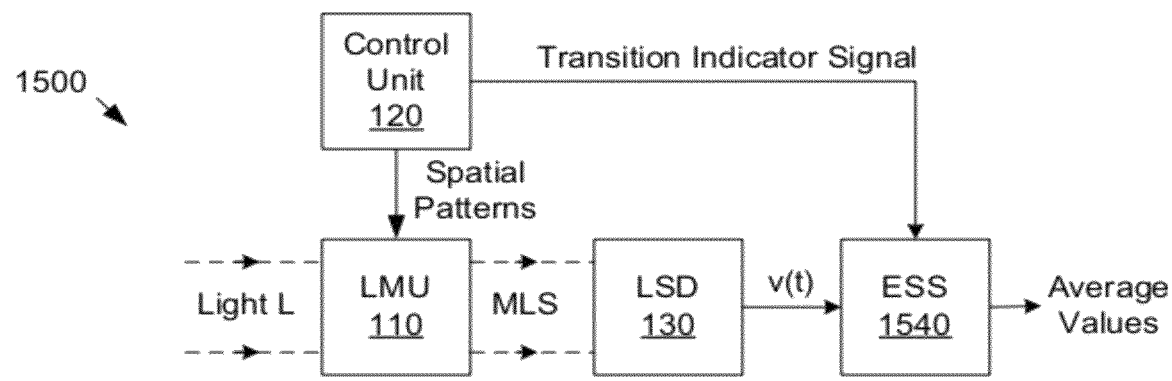
FIG. 15B illustrates an embodiment of system 1500, wherein control unit 120 provides a transition indicator signal to the electronic subsystem 1540.

In some embodiments, system 1500 may include the above-described control unit 120, as shown in FIG. 15B. The control unit supplies the sequence of spatial patterns to the light modulation unit 110. Furthermore, the control unit may provide the electronic subsystem 1500 with a transition indicator signal. The transition indicator signal indicates when transitions occur between one spatial pattern and the next. The electronic subsystem 1540 may use active edges (e.g., leading edges, or alternatively, falling edges) of the transition indicator signal to group samples into subsets, each subset being associated with a corresponding one of the spatial patterns.

In some embodiments, the light modulation unit 110 is configured to modulate the incident light stream with the sequence of spatial patterns at a rate of $R_P$ spatial patterns per second, and the electronic subsystem 1540 is configured to sample the electrical signal at a rate of $R_S$ samples per second, where the rate $R_S$ is greater than or equal to $2R_P$ and is an integer multiple of $R_P$.

In alternative embodiments, the rate $R_S$ is greater than $2R_P$, but not an integer multiple of $R_P$.

In some embodiments, the above-described average of the two or more samples corresponding to each spatial pattern is a weighted average. The weight values associated with the weighted average may be programmable. In other words, the electronic subsystem 1540 may include programmable registers that store the weight values.

In one set of embodiments, a method 1600 for operating on light may involve the actions shown in FIG. 16. The method 1600 may be performed using system 1500 in any of its various embodiments.

Action 1610 may include modulating an incident light stream with a sequence of spatial patterns to obtain a modulated light stream, e.g., as variously described above.

Action 1620 may include generating an electrical signal that represents intensity of the modulated light stream as a function of time, e.g., as variously described above.

Action 1630 may include sampling the electrical signal in order to obtain a first sequence of samples, e.g., as variously described above. The first sequence of samples includes two or more samples corresponding to each of the spatial patterns.

Action 1640 may include generating a sequence of average values, including one average value per spatial pattern, by averaging the two or more samples corresponding to each of the spatial patterns to obtain a corresponding one of the average values.

A set of M of the average values are usable to construct an n-pixel image or n-voxel video sequence representing the incident light stream. M and n are positive integers, and M is smaller than n. The integer n and the compression ratio M/n may take any of wide variety of values, e.g., as variously described above.

In some embodiments, the average of the two or more samples that correspond to each spatial pattern is a weighted average. The weight values associated with the weighted average may be programmable.

Filtering the Compressive-Imaging Measurements to Remove Noise

Figure 17:
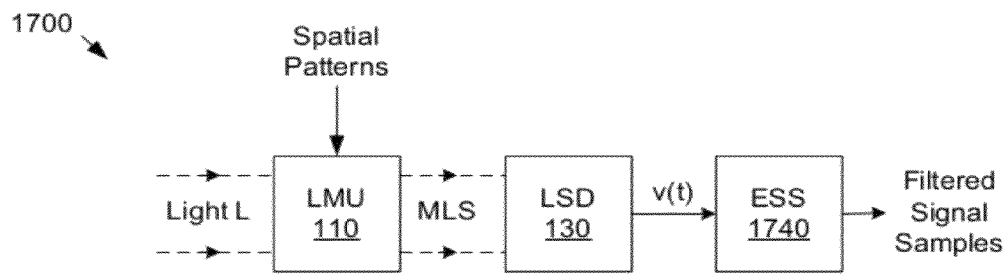
FIG. 17 illustrates an embodiment of a system 1700 for attenuating noise by filtering the electrical signal v(t) in the analog domain and/or in the digital domain.

In one set of embodiments, a system 1700 may be configured as shown in FIG. 17. System 1700 may include the light modulation unit 110 and the light sensing device 130 as variously described above, and may also include electronic subsystem 1740. (Furthermore, system 1700 may include any subset of the features, embodiments and elements described above.)

The light modulation unit 110 is configured to produce a modulated light stream by modulating an incident stream of light L with a sequence of spatial patterns, e.g., as variously described above.

The light sensing device 130 is configured to generate an electrical signal v(t) that represents intensity of the modulated light stream as a function of time, e.g., as variously described above. As described above, the light sensing device 130 may include an amplifier (e.g., a TIA) in addition to a light sensing element, in which case the electrical signal v(t) may be interpreted as the output of the amplifier (i.e., the amplified signal produced by the amplifier).

The electronic subsystem 1740 is configured to apply a filter to the electrical signal v(t) in order to obtain a filtered signal. The filter is configured to attenuate one or more noise components present in the electrical signal v(t). In some embodiments, the filter may be a linear filter, e.g., an FIR filter or an IIR filter. In different embodiments, the filter may be a lowpass filter, a bandpass filter or a highpass filter. In some embodiments, the filter may be a band stop filter having two or more stop bands, or, a band pass filter having two or more pass bands. In some embodiments, the filter may be programmable.

In various embodiments, the filter may be implemented by a microprocessor executing program code, and/or, by an FPGA, and/or, by specialized digital circuitry, and/or, by analog circuitry.

In some embodiments, a set of samples the filtered signal, corresponding to M of the spatial patterns, is usable to construct an n-pixel image or n-voxel video sequence, where M and n are positive integers, and M is less than n. The integer n and the compression ratio M/n may take any of a wide variety of values, e.g., as variously described above.

In some embodiments, the samples of the filtered signal include only one sample per spatial pattern. In other embodiments, the samples of the filtered signal may include more than one sample per spatial pattern. Thus, the two or more samples per spatial pattern may be averaged to obtain a single refined sample per spatial pattern. These refined samples may be used in the image/video construction process.

Figure 18A:
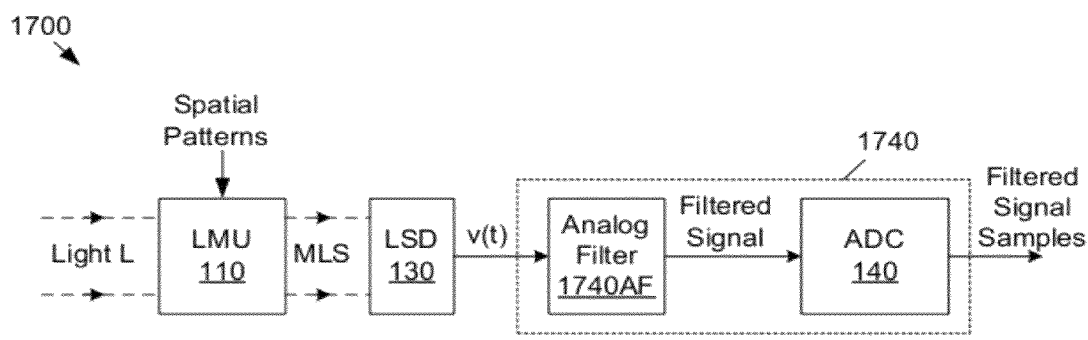
FIG. 18A illustrates an embodiment of a system 1700, where the filtering is performed in the analog domain.

In some embodiments, the filter is an analog filter, and the filtered signal is an analog signal. For example, as shown in FIG. 18A, the electronic subsystem 1740 may include an analog filter 1740AF and the ADC 140. The analog filter 1740AF filters the electrical signal v(t) to obtain the (analog) filtered signal. The ADC 140 acquires samples of the filtered signal. Note that the samples may be restricted to steady state intervals, e.g., as variously described above.

Figure 18B:
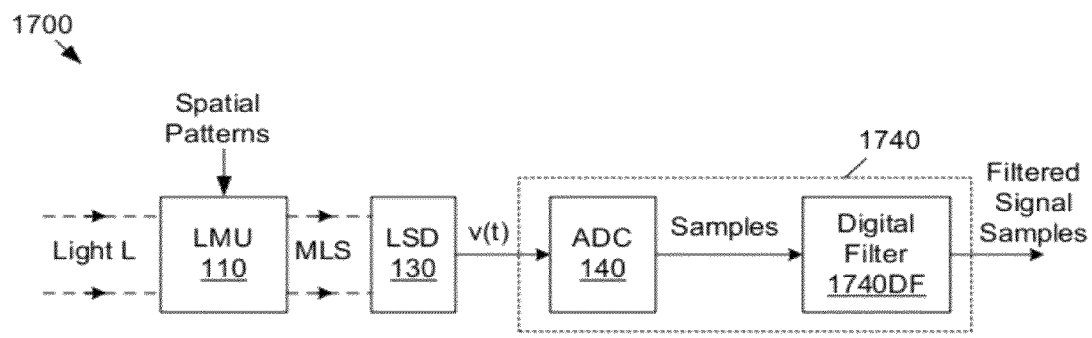
FIG. 18B illustrates an embodiment of a system 1700, where the filtering is performed in the digital domain.

In some embodiments, the filter is a digital filter that is configured to operate on a sampled version of the electrical signal. Thus, the electronic subsystem 1740 may include the ADC 140 and digital filter 1740DF, e.g., as shown in FIG. 18B. The ADC acquires samples of the electrical signal v(t), and the digital filter operates on the samples to produce the filtered signal samples. The digital filter may be implemented by the processing unit 150 as variously described above. In one embodiment, the digital filter is implemented in software using a microprocessor. In another embodiment, the digital filter is implemented using specialized circuitry. In yet another embodiment, the digital filter is implemented in an FPGA.

In some embodiments, the ADC of FIG. 18B may acquire samples continuously (e.g., at least during a light acquisition period), in which case the samples may be subsequently restricted to the steady state intervals as described above. In various embodiments, that restriction process may occur before the digital filter (so the digital filter see only the restricted samples), within the digital filter, or after the digital filter.

In some embodiments, the ADC of FIG. 18B may be configured so that its acquisition of samples is limited to the steady state intervals, e.g., as described above. (See FIG. 11.)

In some embodiments, the one or more noise components being attenuated include noise due to electrical lighting (e.g., indoor electrical lighting) and/or power line noise. Certain kinds of electrical lighting may introduce periodic variation in ambient light level that disturbs the compressive sensing information (the inner products between the image carried by the incident light stream and the respective spatial patterns). For example, fluorescent lights that use magnetic ballasts flicker at twice the supply frequency (60 Hz in the U.S., 50 Hz in Europe). Furthermore, in some embodiments, the system 1700 may be powered by an AC power source, in which case, the system may include an AC-to-DC power supply. Depending on the quality of the power supply, the powerline frequency might be present be on the power signal supplied by the power supply to the light sensing element, the amplifier and ADC 140. These components may have a specification for power supply noise rejection. If the power supply noise exceeds that specification, then the digital output of ADC may include noise at the powerline frequency.

Thus, the filter being applied to the electronic signal v(t) may be designed to attenuate or remove periodic variations at the powerline frequency and/or at twice the powerline frequency. In one embodiment, the filter is a low pass filter whose cutoff frequency is greater than the power line frequency (or greater than twice the powerline frequency) but below the interval of frequency over which the spectrum of the information signal resides. (The information signal might be interpreted as the AC component of the sequence of inner products between the image carried by the incident light stream and the respective spatial patterns. The AC component of any signal is the signal minus its DC component, i.e., its mean value). In some embodiments, the cutoff frequency of the filter may be programmable.

In some embodiments, the filter is a Wiener filter.

In some embodiments, the light sensing device includes an amplifier (e.g., a TIA), and the electrical signal v(t) is the amplified signal produced by the amplifier. In one embodiment, the filter may be optimized to attenuate high frequency noise introduced into the signal path by a TIA.

In some embodiments, the one or more noise components being attenuated by the filter include structured noise, e.g., noise caused by electromagnetic interference (60/120 Hz hum, radio frequency interference, etc.). In some embodiments, structured noise may be estimated using statistical signal techniques such as Wiener filtering, spectrum analysis, etc., and then subtracted from the compressive-imaging measurements to attenuate interference. As described above, the filtering may be implemented in the analog domain and/or in the digital domain.

One method of reducing noise in compressive sensing (CS) is to adaptively filter the noise. This is especially useful for additive, periodic noise such as residual room lighting. This noise occurs at a low frequency (typically 50 or 60 Hz and a few harmonics thereof), whereas the pattern rate on the light modulator will often be in the range of a few kHz or higher.

In such a case, a high-pass or a notch (band-stop) filter may be used to suppress the offending narrow-band, low-frequency noise with little deleterious effect on the desired signal. The filtering can either be in the analog domain (before the ADC), and/or, in the digital domain.

In either case, the filtering can be adaptive. One useful technique is to Fourier transform the signal coming from the detector and look for low-frequency "spikes" in the amplitude spectrum (or power spectrum). Once the frequencies of these spikes are determined, the parameters of the filter (analog or digital) can be adjusted to provide maximal reduction of the offending signal.

An example Fourier spectrum of the data signal is shown in the FIG. 18C. The spectrum may in some embodiments include a roughly white spectral base, with spikes at harmonics of the pattern frequency. There may also be additive noise spikes at low frequency due to line noise, as argued above. Those spikes can be removed by filtering.

The requisite spectrum can be obtained with minimal to no overhead by simply monitoring the samples during normal data acquisition.

Thus, in some embodiments, the processing unit 150 may acquire blocks of samples of the signal v(t), transform each block, analyze the power spectra (or amplitude spectra) to determine frequency locations of spikes occurring low frequencies (e.g., frequencies lower than a cutoff frequency, which may be programmable), adjust the parameters of a filter to optimize the filter for removing or attenuating the spikes (or signal energy in a neighborhood of each of the spikes), and apply the filter to the signal v(t). The filtered signal may then be used to reconstruct images.

In one set of embodiments, a method 1900 for operating on light may involve the actions shown in FIG. 19. The method 1900 may be performed using system 1700, in any of its various embodiments.

Action 1910 may include modulating an incident stream of light with a sequence of spatial patterns to produce a modulated light stream, e.g., as variously described above.

Action 1920 may include generating an electrical signal that represents intensity of the modulated light stream as a function of time, where the action of generating the electrical signal is performed by a light sensing device, e.g., as variously described above.

Action 1930 may include filtering the electrical signal in order to obtain a filtered signal. The action of filtering the electrical signal may be performed by an electronic subsystem, e.g., as variously described above. Furthermore, the action of filtering the electrical signal attenuates one or more noise components present in the electrical signal.

In some embodiments, a set of samples the filtered signal, corresponding to M of the spatial patterns, is usable to construct an n-pixel image or n-voxel video sequence, where M and n are positive integers, and M is less than n. The integer n and the compression ratio M/n may take any of a wide variety of values, e.g., as variously described above.

In some embodiments, the electronic subsystem includes an analog filter, and the filtering action is performed by the analog filter.

In some embodiments, the electronic subsystem includes a digital filter, and the filtering action is performed by the digital filter on a sampled version of the electrical signal.

In some embodiments, the one or more noise components include noise due to indoor electrical lighting and/or power line noise.

In some embodiments, the filtering is performed according a Wiener filtering algorithm.

In some embodiments, the light sensing device includes an amplifier, and the electrical signal generated at 1920 is produced by the amplifier.

Compressive Imaging System 2000

Figure 20:
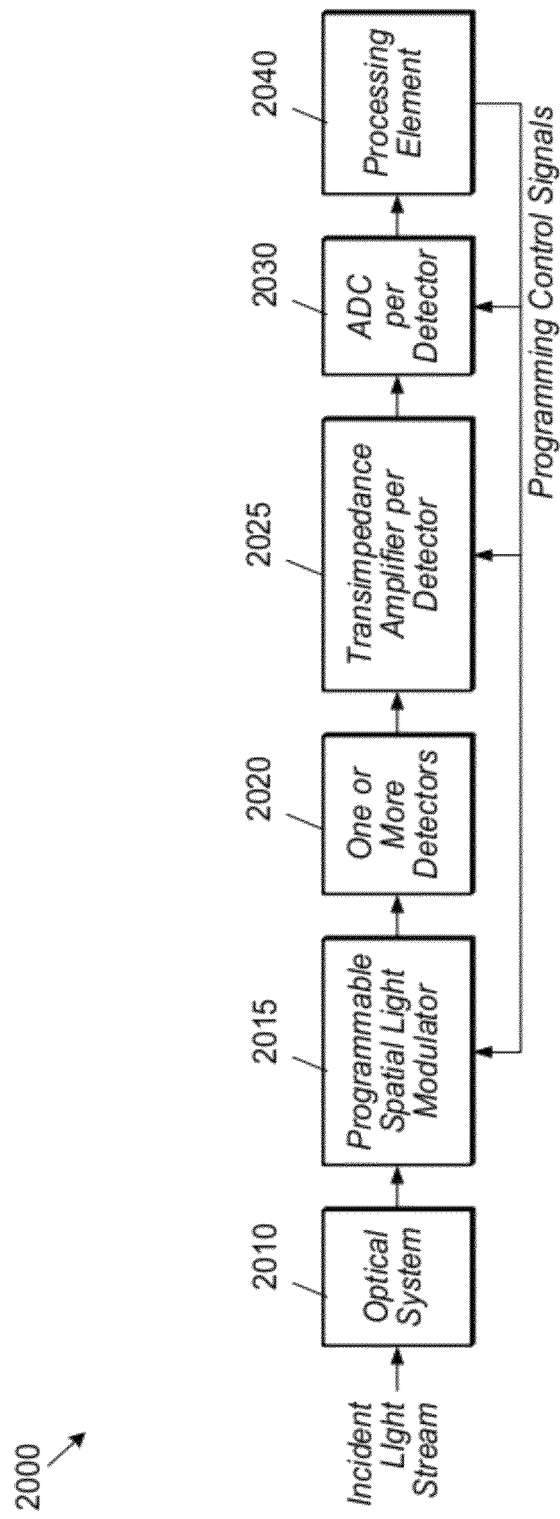
FIG. 20 illustrates one embodiment of a compressive imaging system 2000 that includes one or more detector channels.

In one set of embodiments, a compressive imaging system 2000 may be configured as shown in FIG. 20. The compressive imaging (CI) system may include an optical system 2010, a spatial light modulator 2015, a set 2020 of one or more photodetectors, a set 2025 of one or more amplifiers (i.e., one amplifier per detector), a set 2030 of analog-to-digital converters (one ADC per detector), and a processing element 2040.

The optical system 2010 focuses an incident light stream onto the spatial light modulator, e.g., as variously described above. The incident light stream carries an image (or a spectral ensemble of images) that is to be captured by the CI system in compressed form.

The spatial light modulator 2015 modulates the incident light stream with a sequence of spatial patterns to obtain a modulated light stream, e.g., as variously described above.

Each of the detectors 2020 generates a corresponding electrical signal that represents the intensity of a corresponding portion of the modulated light stream, e.g., a spatial portion or a spectral portion of the modulated light stream.

Each of the amplifiers 2025 (e.g., transimpedance amplifiers) amplifies the corresponding detector signal to produce a corresponding amplified signal.

Each of the ADCs 2030 acquires samples of the corresponding amplified signal.

The processing element 2040 may operate on the sample sets obtained by the respective ADCs to construct respective images. The images may represent spatial portions or spectral slices of the incident light stream. Alternatively, or additionally, the processing element may send the sample sets to a remote system for image construction.

The processing element 2040 may be configured to control one or more other elements of the CI system. For example, in one embodiment, the processing element may be configured to control the spatial light modulator, the transimpedance amplifiers and the ADCs.

It should be understood that the processing element 2040 may incorporate any subset of the embodiments, features, and elements described above. For example, processing element 2040 may include in some or all of the detector channels one or more of: the above-described steady-state sample restriction mechanism, the above-described mechanism of averaging two or more samples per spatial pattern, and the above-described process of filtering noise components.

Figure 21:
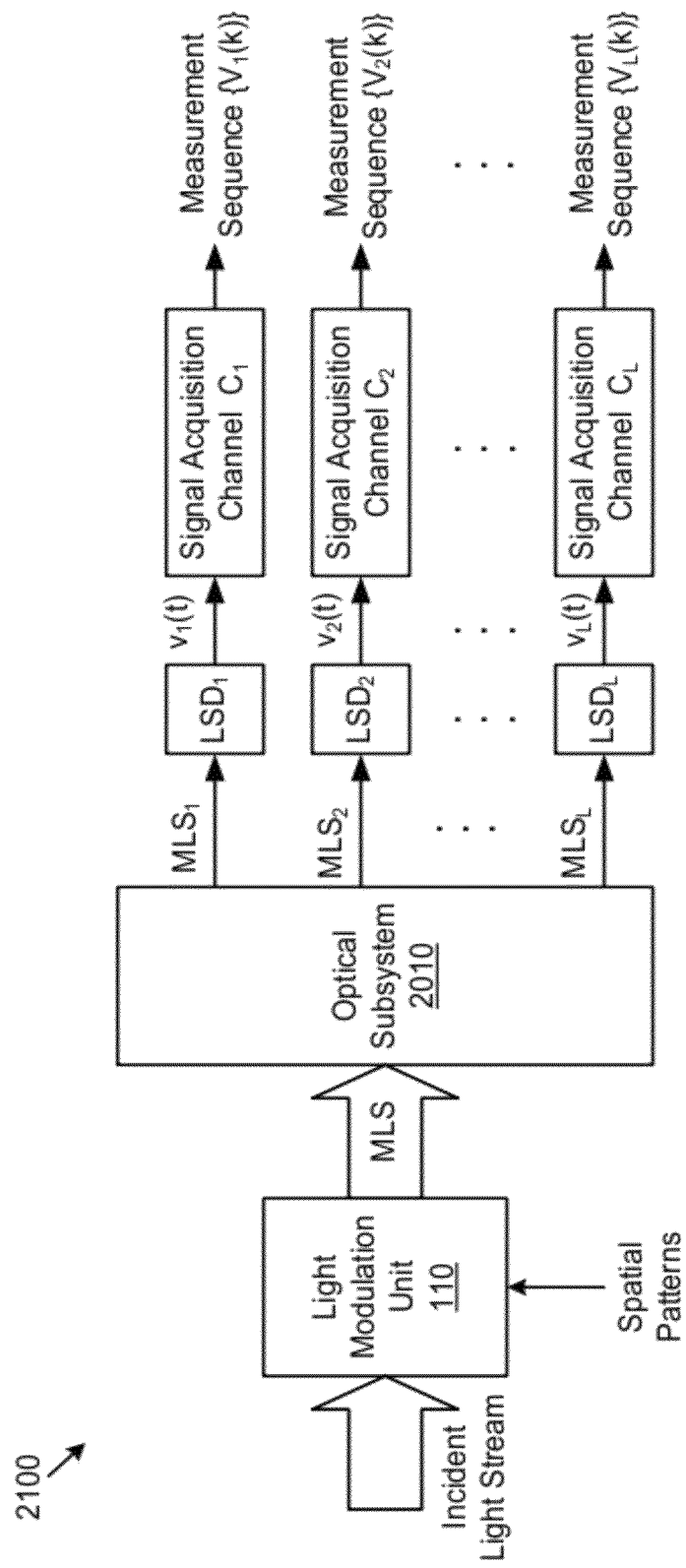
FIG. 21 illustrates one embodiment of a compressive imaging system 2100 that includes one or more signal acquisition channels channels.

In one set of embodiments, a compressive imaging system 2100 may be configured as shown in FIG. 21. The compressive imaging system includes the light modulation unit 110 as variously described above, and also includes optical subsystem 2010, a set of L light sensing devices $LSD_1$ through $LSD_L$, and a set of L signal acquisition channels $C_1$ through $C_L$, where L in a positive integer.

The light modulation unit 110 receives an incident light stream and modulates the incident light stream with a sequence of spatial patterns to obtain a modulated light stream MLS, e.g., as variously described above.

The optical subsystem 2010 delivers portions (e.g., spatial portions or spectral portions) of the modulated light stream to corresponding ones of the light sensing devices $LSD_1$ through $LSD_L$. For more information on how to deliver spatial portions of the modulated light stream onto corresponding ones of the light sensing devices, please see U.S. patent application Ser. No. 13/197,304, filed on Aug. 3, 2011, titled "Decreasing Image Acquisition Time for Compressive Imaging Devices", invented by Woods et al., which is hereby incorporated by reference in its entirety as though fully and completely set forth herein.

In some embodiments, the optical subsystem 2010 includes one or more lenses and/or one or more mirrors arranged so as to deliver spatial portions of the modulated light stream onto respective ones of the light sensing devices. For example, in one embodiment, the optical subsystem 2010 includes a lens whose object plane is the plane of the array of light modulating elements and whose image plane is a plane in which the light sensing devices are arranged. The light sensing devices may be arranged in an array.

In some embodiments, optical subsystem 2010 is configured to separate the modulated light stream into spectral components and deliver the spectral components onto respective ones of the light sensing devices. For example, optical subsystem 2010 may include a grating, a spectrometer, or a tunable filter such as a Fabry-Perot Interferometer to achieve the spectral separation.

Each light sensing device $LSD_j$ generates a corresponding electrical signal $v_j(t)$ that represents intensity of the corresponding portion $MLS_j$ of the modulated light stream.

Each signal acquisition channel $C_j$ acquires a corresponding sequence of samples $\{V_j(k)\}$ of the corresponding electrical signal $v_j(t)$. Each signal acquisition channel may include a corresponding amplifier (e.g., a TIA) and a corresponding A/D converter.

The sample sequence $\{V_j(k)\}$ obtained by each signal acquisition channel may be used to construct a corresponding sub-image which represents a spatial portion or a spectral slice of the incident light stream. The number of samples m in each sample sequence $\{V_j(k)\}$ may be less (typically much less than) the number of pixels in the corresponding sub-image. Thus, each signal acquisition channel $C_j$ may operate as a compressive sensing camera for a spatial portion or spectral portion of the incident light.

Each of the signal acquisition channels may include any subset of the embodiments, features, and elements described above.

Any of the various embodiments described herein may be combined to form composite embodiments. Furthermore, any of the various embodiments described in U.S. Provisional Application No. 61/372,826 and in U.S. patent application Ser. No. 13/193,553, Ser. No. 13/193,556 and Ser. No. 13/197,304 may be combined with any of the various embodiments described herein to form composite embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
    a light modulation unit configured to produce a modulated light stream by modulating an incident stream of light with a sequence of spatial patterns;
    a light sensing device configured to generate an electrical signal that represents intensity of the modulated light stream as a function of time, wherein the light sensing device is further configured to generate a sequence of samples of the electrical signal;
    an electronic subsystem configured to apply a filter to the electrical signal in order to obtain a filtered signal, wherein the filter is configured to attenuate one or more noise components present in the electrical signal, wherein a set of samples of the filtered signal, corresponding to M of the spatial patterns, is usable to construct an n-pixel image or n-voxel video sequence, wherein M and n are positive integers, wherein M is less than n, wherein the electronic subsystem is configured to:
        repeatedly perform spectrum analysis on the sequence of samples of the electrical signal; and
        dynamically determine the filter based on results of said repeatedly performing the spectrum analysis, wherein said applying the filter comprises applying the filter to the sequence of samples of the electrical signal.

2. The system of claim 1, wherein the filter is an analog filter.

3. The system of claim 1, wherein the filter is a digital filter that is configured to operate on the sequence of samples of the electrical signal.

4. The system of claim 1, wherein the one or more noise components include noise due to indoor electrical lighting.

5. The system of claim 1, wherein the one or more noise components include power line noise.

6. The system of claim 1, wherein the filter is a Wiener filter.

7. The system of claim 1, wherein the light sensing device includes an amplifier, wherein the electrical signal is an amplified output signal produced by the amplifier.

8. The system of claim 1, wherein the one or more noise components being attenuated by the filter include structured noise, wherein the electronic subsystem is configured to:
estimate the structured noise by applying Wiener filtering and/or spectrum analysis on the electrical signal; and
subtract the structured noise from compressive-imaging measurements corresponding to the electrical signal.

9. A method comprising:
modulating an incident stream of light with a sequence of spatial patterns to produce a modulated light stream;
generating an electrical signal that represents intensity of the modulated light stream as a function of time, where said generating is performed by a light sensing device, wherein the light sensing device generates a sequence of samples of the electrical signal;
filtering the electrical signal in order to obtain a filtered signal, wherein said filtering is performed by an electronic subsystem, wherein the electronic subsystem includes a filter that is used to perform said filtering, wherein said filtering attenuates one or more noise components present in the electrical signal, wherein a set of samples of the filtered signal, corresponding to M of the spatial patterns, is usable to construct an n-pixel image or n-voxel video sequence, wherein M and n are positive integers, wherein M is less than n;
repeatedly performing spectrum analysis on the sequence of samples of the electrical signal, wherein parameters of the filter are dynamically determined based on results of said repeatedly performing the spectrum analysis.

10. The method of claim 9, wherein said filter is an analog filter, wherein said filtering is performed by the analog filter.

11. The method of claim 9, wherein said filter is a digital filter, wherein said filtering is performed by the digital filter on the sequence of samples of the electrical signal.

12. The method of claim 9, wherein the one or more noise components include noise due to indoor electrical lighting.

13. The method of claim 9, wherein the one or more noise components include power line noise.

14. The method of claim 9, wherein said filtering is performed according a Wiener filtering algorithm.

15. The method of claim 9, wherein the light sensing device includes an amplifier, wherein the electrical signal is produced by the amplifier.

16. The method of claim 15, wherein said filtering attenuates high-frequency noise introduced by the amplifier.

17. The method of claim 9, wherein the one or more noise components being attenuated include structured noise, the method further comprising:
estimating the structured noise by applying Wiener filtering and/or spectrum analysis on the electrical signal; and
subtracting the structured noise from compressive-imaging measurements corresponding to the electrical signal.

18. The system of claim 9, wherein the filter is configured to attenuate high-frequency noise introduced by the amplifier.

* * * * *